(12) United States Patent
Karaoguz et al.

(10) Patent No.: US 7,379,504 B2
(45) Date of Patent: May 27, 2008

(54) OPTIMAL TRELLIS CODE DESIGN FOR QPSK AND HIGHER ORDER QUADRATURE AMPLITUDE MODULATIONS

(75) Inventors: Jeyhan Karaoguz, Irvine, CA (US); Gottfried Ungerboeck, Langnau (CH)

(73) Assignee: Broadcom Corporation, Irvine, CA (US)

( * ) Notice: Subject to any disclaimer, the term of this patent is extended or adjusted under 35 U.S.C. 154(b) by 932 days.

(21) Appl. No.: 10/263,215

(22) Filed: Oct. 2, 2002

(65) Prior Publication Data

US 2003/0067992 A1    Apr. 10, 2003

Related U.S. Application Data

(60) Provisional application No. 60/328,049, filed on Oct. 9, 2001.

(51) Int. Cl.
   *H04L 5/12* (2006.01)
(52) U.S. Cl. ..................................... 375/265
(58) Field of Classification Search ............... 375/259, 375/265, 295, 298, 261
   See application file for complete search history.

(56) References Cited

U.S. PATENT DOCUMENTS 5,621,761 A * 4/1997 Heegard ..................... 375/265

OTHER PUBLICATIONS

Ungerboeck G; "Trellis-Coded Modulation with Redundant Signal Sets Part II: State of the Art", IEEE Communication Magazine, vol. 25, No. 2, Feb. 1, 1987, pp. 12-21, IEEE, Piscataway, Nj.*

Heegard C et al: "Practical Coding for QAM Transmission of HDTV", IEEE Journal on Selected Areas in Communications, vol. 11, No. 1, 1993, pp. 111-1118, XP000378002, IEEE, New York, US.
Ungerboeck G: "Trellis-Coded Modulation with Redundant Signal Sets Part II: State of the Art", IEEE Communications Magazine, vol. 25, No. 2, Feb. 1, 1987, pp. 12-21 XP000565140, IEEE, Piscataway, NJ, US.
Chan F. et al.: "Performance of punctured trellis coded modulation over fading channels" Vehicular Technology Conference, May 4-7, 1997, pp. 339-343, XP 0120228807, IEEE, New York, US.
Bryan D A et al: "Channel coding, modulation, and transmission for North American digital television" Philips Journal of Research, vol. 50, No. 1, 1996, pp. 131-157, XP004008207 Elsevier, Amsterdam, NL.

* cited by examiner

*Primary Examiner*—Kevin Burd
(74) *Attorney, Agent, or Firm*—Garlick Harrison & Markison; Bruce E. Garlick

(57) ABSTRACT

A wireless device and system employs a two-dimensional (2-D) Trellis code that can be applied to Quadrature Phase Shift Keying (QPSK) and higher order Quadrature Amplitude Modulation (QAM) constellations. The Trellis codes employed have optimal Euclidean distance properties for QPSK constellations, and have very good Euclidean distance properties for higher-order QAM constellations. The Trellis codes are suited for transmission systems that adopt multi-mode QPSK and QAM constellations with different data rates since the same Trellis code can be applied to all modulation formats and the same decoder can be used at the receiver for all modulation formats. Modulation formats include QPSK, 8-QAM, 16-QAM, 32-QAM, and 64-QAM and may be extended to even higher order modulations formats.

28 Claims, 18 Drawing Sheets

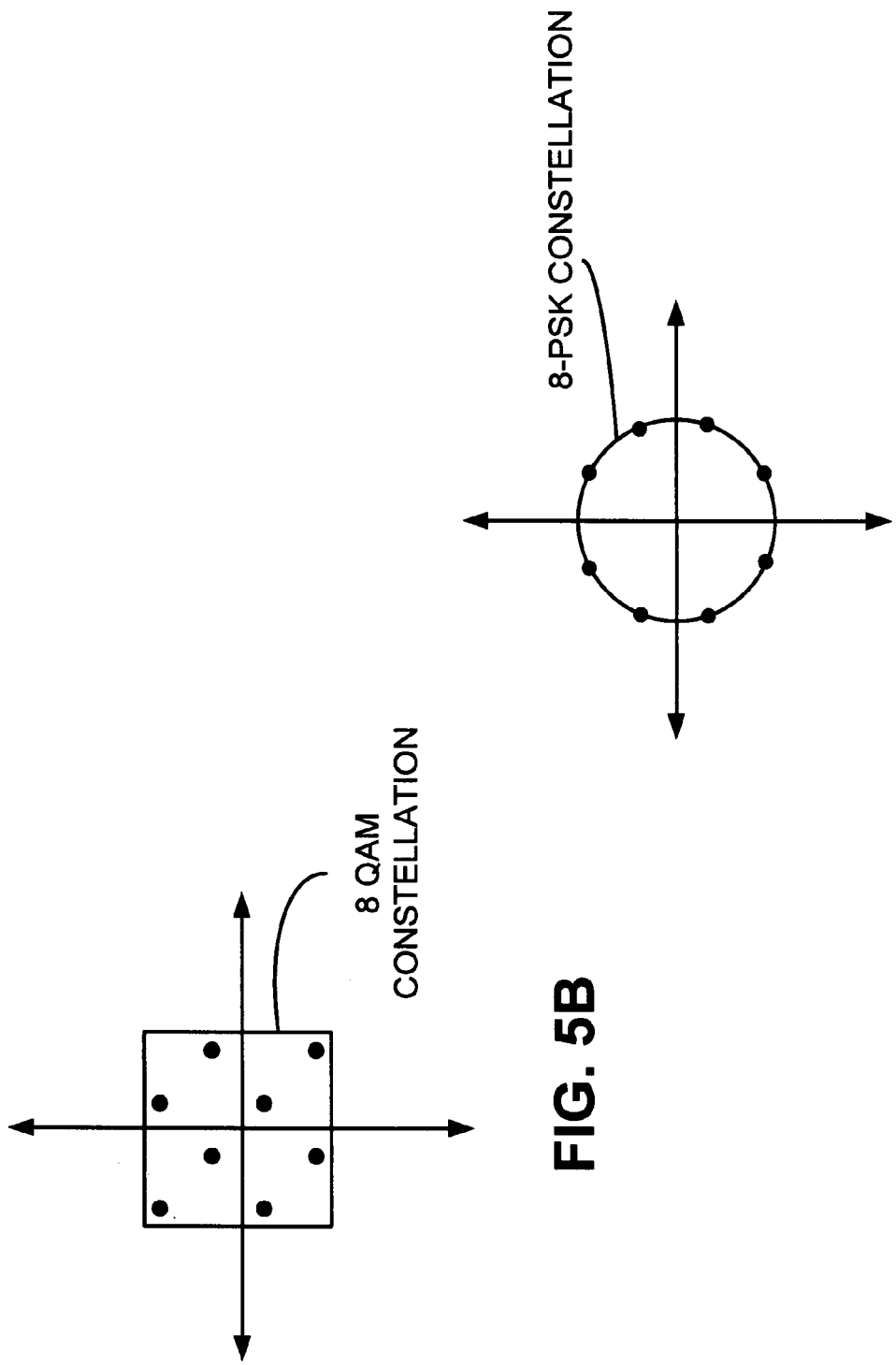

OPTIMAL TRELLIS CODE DESIGN FOR QPSK AND HIGHER ORDER QUADRATURE AMPLITUDE MODULATIONS

CROSS REFERENCES TO RELATED APPLICATIONS

This application claims priority to U.S. Provisional Application Ser. No. 60/328,049, filed Oct. 9, 2001, which is incorporated herein by reference in its entirety.

BACKGROUND OF THE INVENTION

1. Technical Field of the Invention

This invention relates generally to wireless communications; and more particularly to low power high data rate communications.

2. Description of Related Art

Communication technologies that link electronic devices are well known in the art. Some communication technologies link electronic devices via networks. Examples of such networks include wired computer networks, wireless computer networks, wired telephone networks, wireless telephone networks, and satellite communication networks, among other networks. Within such communication networks, a network infrastructure couples electronic devices to one another.

The need for wireless networking has been addressed by various standards bodies that promulgate interworking standards. One such standards body promulgated the IEEE 802.11 standard that defines a wireless LAN. In a typical 802.11 wireless LAN, a wired backbone couples to one or more wireless access points (WAPs) that wirelessly connect to many computers or other electronic devices that contain wireless interfaces. IEEE 802.11 networks have achieved significant success in servicing wireless communication needs for portable computers, portable data terminals, and other wireless devices that transmit and receive data. However, IEEE 802.11 networks lack high data rate and Quality of Service (QOS) features to support multimedia communications.

Wireless personal area networks "WPAN" enable short-range "ad-hoc" connectivity among portable consumer electronics and communications devices but do not require the infrastructure needed for an 802.11 network. The coverage area for a WPAN is generally within a 10-meter radius. The term "ad-hoc" connectivity refers to both the ability for a device to assume either master or slave functionality and the ease in which devices may join or leave an existing network.

The Bluetooth radio system has emerged as the first technology addressing WPAN applications with its salient features of low power consumption, small package size, and low cost. Raw data rates for Bluetooth devices are limited to 1 Mbps, although the actual throughput is about half of the raw data rate. A Bluetooth communication link supports up to three voice channels with very limited additional bandwidth for bursty data traffic. However, Bluetooth communication links cannot support the data transfer requirements of portable consumer electronics devices that transmit and receive multimedia data, e.g., high quality video applications, audio applications, and multi-megabyte file transfers for music and image files.

To support higher data rates in wireless systems, higher order modulations are often employed, e.g., 8-QAM, 16-QAM, 32-QAM, 64-QAM, 128-QAM, etc. However, higher order modulations are susceptible to fading and interference, particularly at the low transmission powers employed in WPAN applications. Thus, to provide flexibility in operation, multiple constellation sizes are typically supported within wireless systems of this type. Larger constellations are used for higher quality channels while smaller constellations are used for lower quality channels.

Forward Error Correction (FEC) is commonly included in wireless systems. The usually employed Reed Solomon block codes add non-information-carrying parity bytes to the transmitted data bytes. In the absence of errors FEC reduces the actual data throughput for a given channel bit rate. However, when errors occur, the capability of correcting errors up to a certain extent decreases the number of required retransmissions thereby increasing the effective data throughput.

While FEC schemes operate on hard-quantized bits and/or bytes, it is desirable to provide an "inner" coded modulation scheme that is more specifically designed to deal with non-binary modulation symbols and noisy received signals. Trellis Coded Modulation (TCM) is a commonly employed inner coding scheme. Further, because the quality of wireless channels changes over time, it is desirable to vary constellation sizes depending on channel conditions. In a WPAN system, for example, each wireless device must therefore support TCM with a plurality of constellation sizes. In order to minimize complexity, it is desirable to use one common TCM scheme for all constellation sizes. This scheme should provide optimal performance for each constellation, which means that for a given number of code states and a given constellation, no other scheme should exist with better performance than the common scheme. Well known TCM schemes are optimal for all types of Quadrature Amplitude Modulation (QAM), but not simultaneously also for Quadrature Phase Shift Keying (QPSK).

BRIEF SUMMARY OF THE INVENTION

The present invention relates to two-dimensional (2-D) trellis encoding for Quadrature Phase Shift Keying (QPSK) and higher order Quadrature Amplitude Modulation (QAM) schemes. In TCM systems of this type, a first set of information bits is encoded by a convolutional encoder into coded bits, which together with a second set of information bits are mapped into 2-D modulation symbols. Optimal trellis codes are designed to achieve with a given number of code states largest free Euclidean distance between permitted sequences of modulation symbols. Well known optimal TCM schemes employ one convolutional encoding function to generate optimally encoded 8 QAM or higher order QAM symbols, but require another convolutional encoding function to generate optimally encoded QPSK symbols. In a TCM scheme constructed according to the present invention, the same convolutional encoding function is used to generate optimally encoded QPSK or QAM symbols. Hence, the TCM schemes of the present invention are ideally suited for transmission systems that adopt multi-mode QPSK and QAM formats to encode different numbers of information bits per symbol.

A variable data rate TCM encoder constructed according to the present invention includes a variable rate input, a Finite State Machine (FSM) modeling the function of a convolutional encoder, and a variable rate symbol mapper. During each symbol period, the TCM encoder receives via the variable rate input k information bits, where $k \geq 1$. The FSM always receives two input bits, a first FSM input bit and a second FSM input bit. When QPSK modulation is selected, the first FSM input bit represents an information bit, while the second FSM input bit is set to zero. For 8-QAM (or 8-PSK) and higher order QAM modulations, both FSM input bits represent information bits. Based upon the two FSM inputs and the state of the FSM at the beginning of the symbol period, the FSM produces an FSM output bit and transitions to a next state.

The variable rate symbol mapper receives during each symbol period the FSM output bit and k (one or more) information bits, and maps the k+1 bits into a symbol of a 2-D symbol constellation of size $2^{k+1}$. A mode selection input determines the symbol constellation to be employed, which in turn determines the value of k: for QPSK, k=1; for 8-QAM/8-PSK, k=2; for 16-QAM, k=3; and so forth. The k+1 bits may be mapped to the selected symbol in any of a number of various manners, some of which are known.

With the $2^{k+1}$-ary constellation of the present invention, $d^2$ denotes the squared minimum Euclidean distance between symbols. In accordance with the principle of set partitioning as used with the present invention, the $2^{k+1}$-ary constellation is first partitioned into two disjoint first-level subsets of size $2^k$, such that the minimum intra-subset Euclidean distances are maximized. For QPSK and QAM constellations, the squared minimum intra-subset distance of the first-level subsets becomes $2d^2$. The variable rate symbol mapper selects one of the two first-level subsets based on the output bit received from the FSM, and then selects one symbol among the $2^k$ subset symbols based on the k information bits.

The variable rate TCM encoders of the present invention use the same FSM for coded QPSK and higher order QAM/8PSK modulations. The FSM output bits represent a sequence of parity-check bits over the sequence of two FSM input bits per symbol period, one being set to zero in the case of QPSK. The functionality of the FSM may be accomplished by a plurality of binary storage elements and a plurality of modulo-two adders that are intercoupled with one another, or may be achieved in any other equivalent manner. The generation of parity check bits by the FSM is governed by a 1×3 parity-check matrix. The first two elements of the parity-check matrix are associated with the second and first FSM input bits, respectively. The third element is associated with the FSM output bits. Each element is specified in the well-known form of a polynomial with binary coefficients over the indeterminate D, which represents the delay operator for a one-symbol delay.

In a first group of embodiments of the invention, the FSM includes three storage elements representing 8 code states, and the parity check matrix is $[D^2, D, D^3+D^2+1]$ or its reverse-time equivalent $[D, D^2, D^3+D^2+1]$. With these embodiments, the squared free Euclidean distance between sequences of coded QPSK symbols is $6d^2$, where d is the distance between constellation points. For higher order constellations, the free Euclidean distance is $5d^2$.

In a second group of embodiments, the FSM includes three storage elements representing 8 code states, and the parity check matrix is $[D^2, D, D^3+D^2+D+1]$ or its reverse-time equivalent $[D, D^2, D^3+D^2+D+1]$. The free Euclidean distance is again $6d^2$ for QPSK, and $5d^2$ for higher order constellations.

In a third group of embodiments, the FSM includes four storage elements corresponding to 16 code states. The parity check matrix is $[D^3+D^2+D, D^2, D^4+D+1]$ or the reverse-time equivalent $[D^3+D^2+D, D^2, D^4+D^3+1]$. With this third group of embodiments, the squared free Euclidean distance is $7d^2$ for QPSK and $6d^2$ for higher order constellations.

Other features and advantages of the present invention will become apparent from the following detailed description of the invention made with reference to the accompanying drawings.

BRIEF DESCRIPTION OF THE SEVERAL VIEWS OF THE DRAWINGS

FIG. 5B is a diagram illustrating one example of an 8-QAM constellation that employs a subset of constellation points of the full 64-QAM constellation of FIG. 4 that may be used with the present invention;

FIG. 5C is a diagram illustrating one example of an 8-PSK constellation that may be used with the present invention;

DETAILED DESCRIPTION OF THE INVENTION

Figure 1:
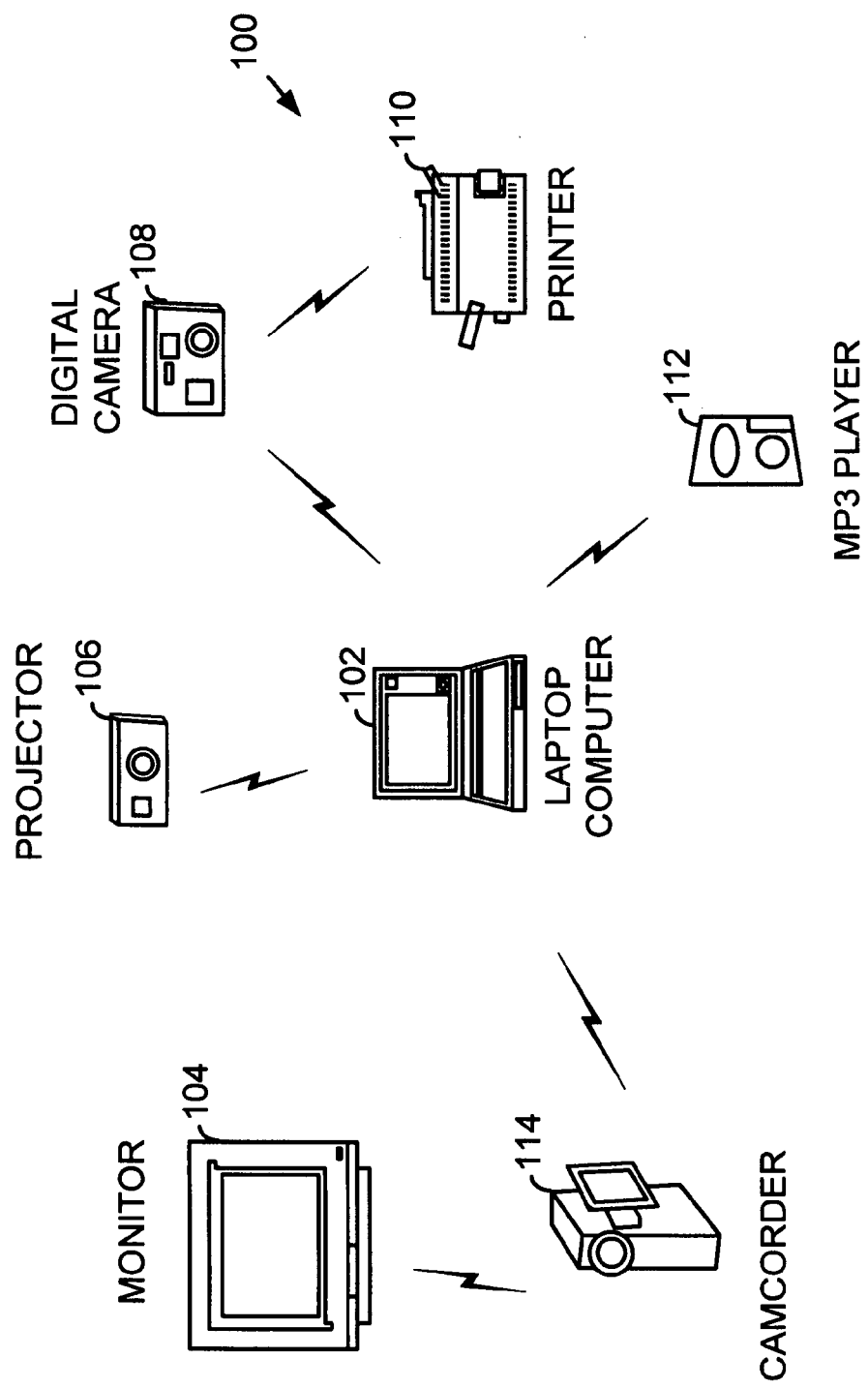
FIG. 1 is a system diagram illustrating a number of wireless devices that wirelessly communicate according to the present invention.

FIG. 1 is a system diagram illustrating a number of wireless devices that wirelessly communicate according to the present invention. These devices include a laptop computer 102, a monitor 104, a projector 106, a digital camera 108, a printer 110, an MP3 player 112, and a camcorder 114 (among other devices that may wirelessly communicate according to the present invention). These devices wireless intercouple by establishing and breaking down Wireless Personal Area Networks (WPANs).

Figure 2:
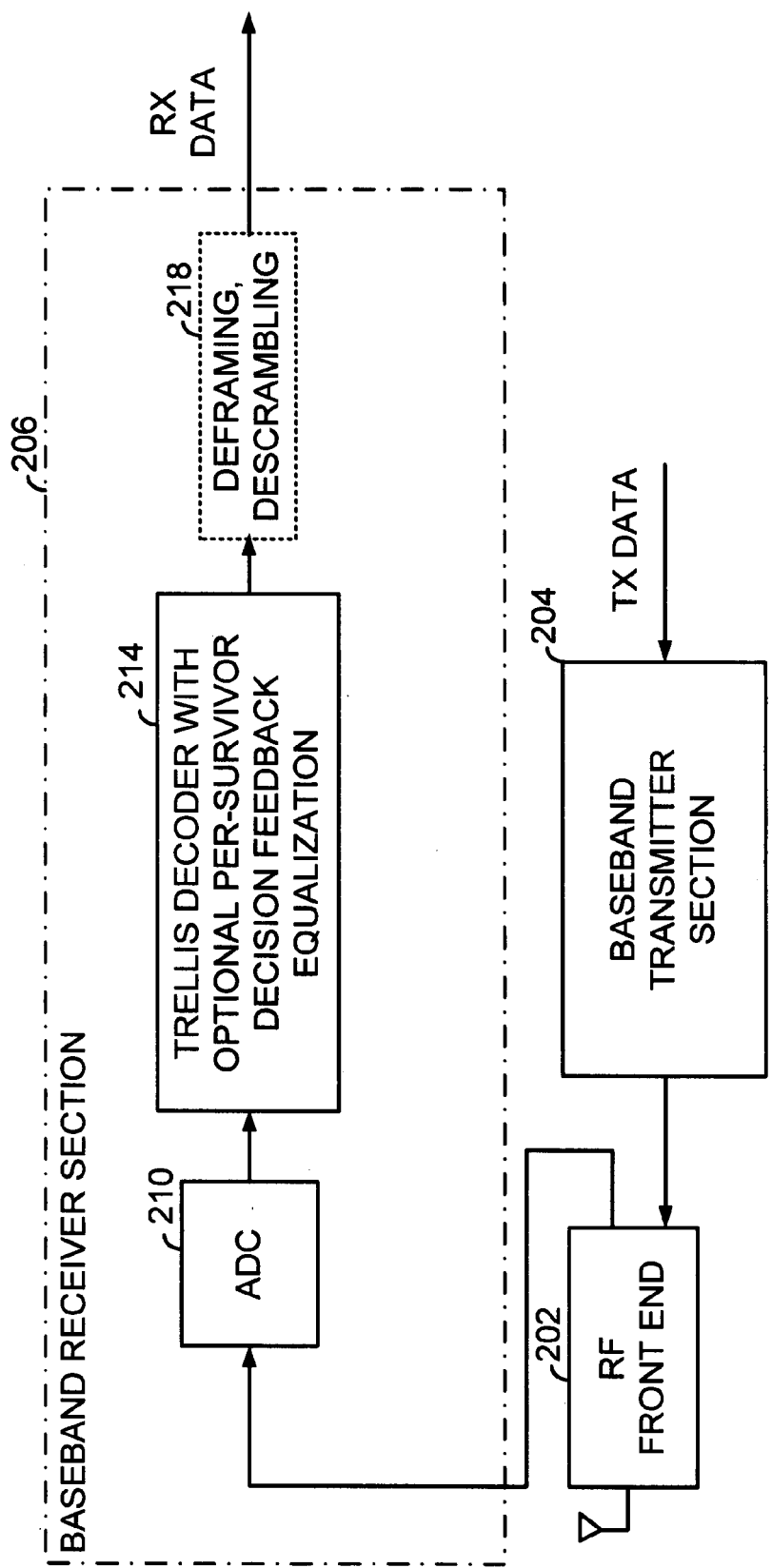
FIG. 2 is a block diagram illustrating a wireless interface constructed according to the present invention illustrating a baseband receiver section in detail.
Figure 3:
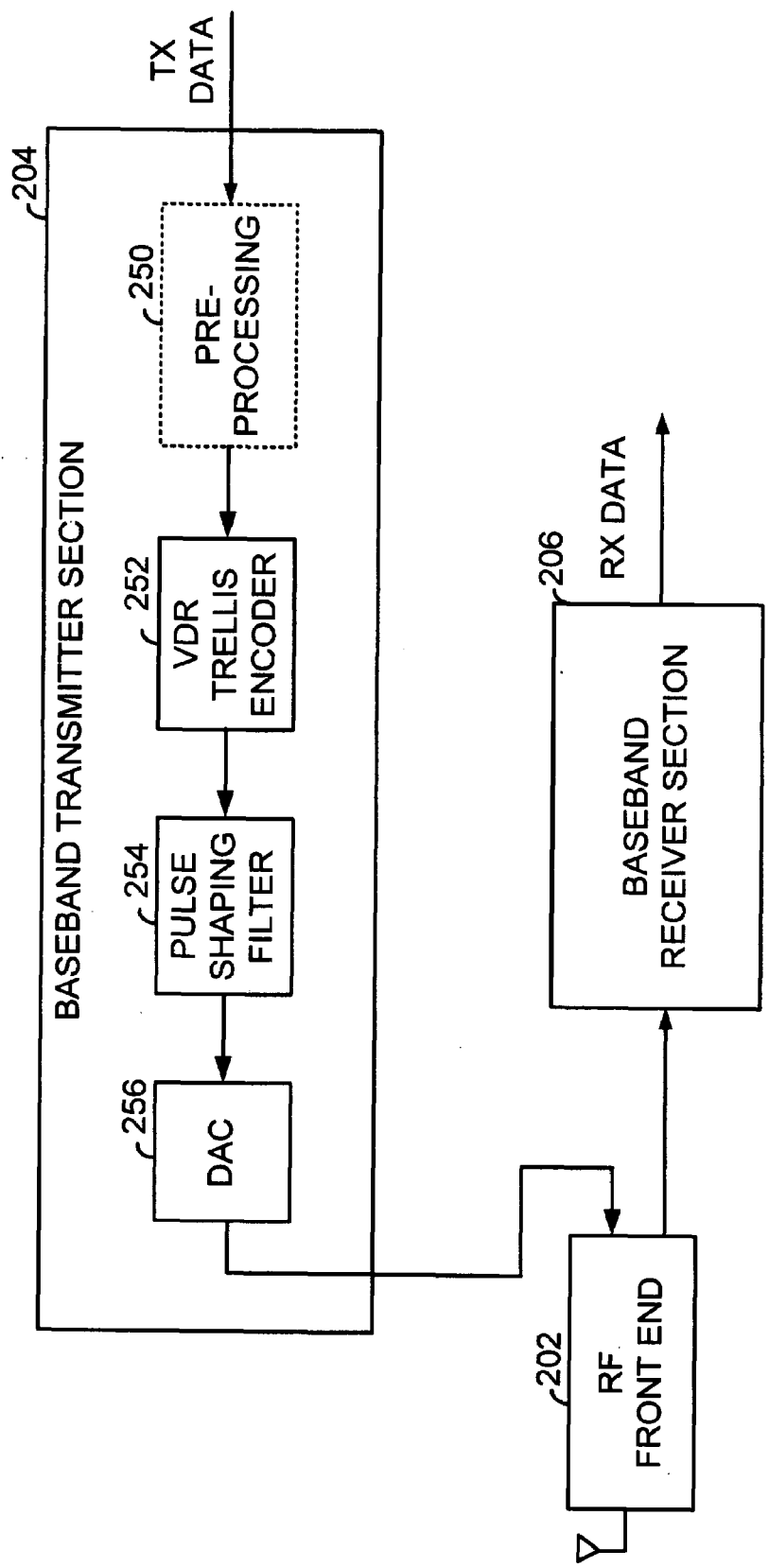
FIG. 3 is a block diagram illustrating a wireless interface constructed according to the present invention illustrating a baseband transmitter section in detail.

Each of these wireless devices includes a wireless interface constructed according to the present invention that includes a Radio Frequency (RF) transceiver and a baseband processor having a transmitter section and a receiver section path (as described further with reference to FIGS. 2 and 3. The description of the present invention focuses primarily on the transmitter section of the baseband processor that includes a variable data rate Trellis Code Modulation (TCM) encoder, although the present invention applies to the receiver section as well that includes a variable data rate TCM decoder. The communication requirements serviced according to the present invention may be grouped into two general categories. The first category involves bulky (multi-mega-byte), data file transfers. The second category involves the transfer of streaming data, e.g., video and audio data, and the transfer of other data in a near real-time application.

In an example of a communication of the first category, the digital camera 108 and the camcorder 114 store multi-mega-byte image files and video streams in digital format. These files must be transferred from the devices to a central repository such as the laptop computer 102. Thus, according to the present invention, during one operation, the digital camera 108 and the laptop computer 102 establish a wireless link and the digital camera 108 downloads one or more image files to the laptop computer 102. The size of such an image file may be 3 Mbyte or greater. According to the present invention, this 3 Mbyte file may be downloaded in a matter of a few seconds, as compared to minutes that would be required using prior wireless technologies.

Another related application of the first category is in the digital distribution of music where music files in MP3 or CD format can be transferred between a computer, e.g., laptop computer 102 and an MP3 or CD player, e.g., MP3 Player 112. In particular, an MP3 file containing a single song can be much larger than 3 Mbytes, which necessitates physical layer data rates much higher than 1 Mega bits per second (Mbps) if the transfer is to be completed within a 7 to 15 second time frame. According to the present invention, at data rates of 22 Mbps to 55 Mbps, the 3 Mbyte file is downloaded in a matter of seconds.

In an example of a communication of the second category, the high rate wireless interconnection of the present invention is used as a cable replacement technology for computer systems, home entertainment systems, gaming systems, and other systems requiring streaming (or near streaming) communication operations. For example, such a high rate wireless interconnection of the present invention may be used to transfer data from the laptop computer 102 to the projector 106 or to the printer 110. Further, the high rate wireless interconnection of the present invention may be employed by the camcorder 114 to stream digital video data to the monitor 104. According to the present invention, data streams of up to 55 Mbps are supported at a distance of up to approximately 10 Meters.

The high rate high rate wireless interconnection of the present invention may be employed for interactive games, which are built around 3-D graphics and high quality audio. In such case, a high rate high rate wireless interconnection is established to wirelessly connect multi-player game consoles and high definition displays or virtual-reality goggles. With the high data rate high rate wireless interconnection of the present invention, the high-quality-graphics-based interactive games having multiple consoles and virtual-reality-goggles are easily serviced at required levels.

The high rate high rate wireless interconnection of the present invention may find compelling applications as a cable replacement technology for home entertainment systems capable of high definition video and high fidelity sound. The distribution of CD audio quality sound requires 1.5 Mbps data rate, while AC3 Dolby and MP3 audio streams require 384 Kbps and 128 Kbps, respectively. Consequently, with the WPAN of the present invention, a high rate WPAN can be established between a CD or MP3 player 112 and wireless headsets or speakers and employed to service all communications there between. Further, the WPAN of the present invention may be employed to wirelessly direct high quality audio from a source to surround sound speakers.

The WPAN of the present invention supports "ad-hoc" networking, multi-media QoS provisions, and power management. In an "ad-hoc" network, devices can assume either master or slave functionality based on existing network conditions. Devices in an ad-hoc network need not be assigned any Ethernet or IP addresses, and can subsequently join or leave an existing network without elaborate set-up procedures that are otherwise carried out by a system administrator. These operations, as well as others, are set forth in the IEEE 802.15.3 working group specifications. The teachings described herein relate to a receiver that operates to support the IEEE 802.15.3 specification. Table 1 describes generally one example of the operations of a WPAN operating according to the present invention.

TABLE 1

| High Rate WPAN Operating Specifications | |
| --- | --- |
| Frequency Range | 2.4–2.4835 GHz |
| Symbol Rate | 11 Msymbols/s |
| Modulation Formats | QPSK, QPSK/TCM, 16, 32, 64-QAM/TCM |
| Coding | QPSK (in some operations) no coding QPSK (in other operations), 16, 32, 64-QAM: 8-State Trellis Code Modulated (TCM) |
| Data Rates | 11 Mbps (QPSK/TCM) 22 Mbps (QPSK) 33 Mbps (16-QAM/TCM) 44 Mbps (32-QAM/TCM) 55 Mbps (64-QAM/TCM) |
| Base Modulation | QPSK |
| RF Bandwidth | 15 MHz |
| Number of Channels | 4 |
| Transmit Power | 0 to 8 dBm |
| Range | 10 m |

In order to support high data rates, the wireless devices of the present invention communicate at high symbol rates using high order modulation schemes. These devices typically operate at low transmit power, may operate in noisy environments, and must support high rate operations. Thus, these devices employ TCM with QPSK and QAM modulation.

According to the present invention, these devices use a two-dimensional (2-D) Trellis code that is applied to QPSK and higher order QAM signaling schemes. One point of novelty of these TCM schemes is the use of a single FSM with different mappings into modulation symbols, thereby achieving optimal Euclidean distance properties between sequences of coded QPSK symbols as well as higher order QAM symbols. This means that largest free Euclidean distance achievable for a given number of code states and type of modulation is obtained with the same trellis transition diagram for all these modulations. The codes of the present invention are suited for transmission systems that adopt multi-mode QAM formats with different data rates since the same code can be applied to all modulation formats and the same decoder can be used at the receiver for all modulation formats.

FIG. 2 is a block diagram illustrating a wireless interface constructed according to the present invention illustrating a baseband receiver section in detail. Each of the wireless devices of 102–114 includes a wireless device, such as that illustrated in FIG. 2. The wireless interface includes an RF transceiver 202 and a baseband processor that includes a baseband transmitter section 204 and a baseband receiver section 206. The baseband processor couples to a host device, e.g., a host device of the wireless devices 102–114 illustrated in FIG. 1. The general structure of wireless interfaces and the manner in which they interface to a host are generally known and will not be described further herein except as it relates to the present invention.

The baseband receiver section 206 receives an analog baseband signal from the RF transceiver 202 that carries RX data. The baseband receiver section includes an Analog-to-Digital-Converter (ADC) 210 that samples the analog baseband signal. The output of the ADC 210 is received by a decision feedback sequence estimator 214 that equalizes the sampled analog baseband signal, produces at least one soft decision for each symbol of the sampled analog baseband signal, and performs TCM decoding operations according to the present invention. The remainder of the disclosure herein describes the operation of a variable data rate TCM encoder that operates according to the present invention. The TCM decoder operations performed by the decision feedback sequence estimator 214 may be Viterbi decoding operations, for example, to decode a symbol stream that has been coded by a paired TCM encoder of another wireless device with which the wireless interface of FIG. 2 communicates. An optional deframing/descrambling block 218 performs data de-framing, data descrambling, and/or other bit level operations. When the optional deframing/descrambling block 218 is not present, the variable data rate Trellis Decoder 216 produces the RX data. The structure of Trellis Decoders is generally known in the art and such known Trellis Decoders may be modified to operate upon the Trellis codes of the present invention described herein.

FIG. 3 is a block diagram illustrating a wireless interface constructed according to the present invention showing a baseband transmitter section in detail. The baseband transmitter section 204 receives Transmit (TX) data from its serviced host and preprocesses the TX data at optional pre-processing block. When present, the pre-processing block 250 performs data framing, data scrambling, and/or other bit level operations. The output of the pre-processing block 250 is received by a variable data rate TCM encoder 252 that operates according to the present invention and that will be described further herein with reference to FIGS. 4–17. The output of the variable data rate TCM encoder 252 is provided to a pulse-shaping filter 254. The output of the pulse shaping filter 254 is received by an Digital-to-Analog-Converter (DAC) 256 that converts the digital signal received to an analog baseband transmit signal that is provided to the RF transceiver 202 for wireless transmission to a receiving wireless device. In other embodiments, the output of the variable data rate TCM encoder 252 is in an analog format, the pulse-shaping filter 254 is an analog filter, and the output of the pulse-shaping filter 254 is provided directly to the RF transceiver 202.

Figure 4:
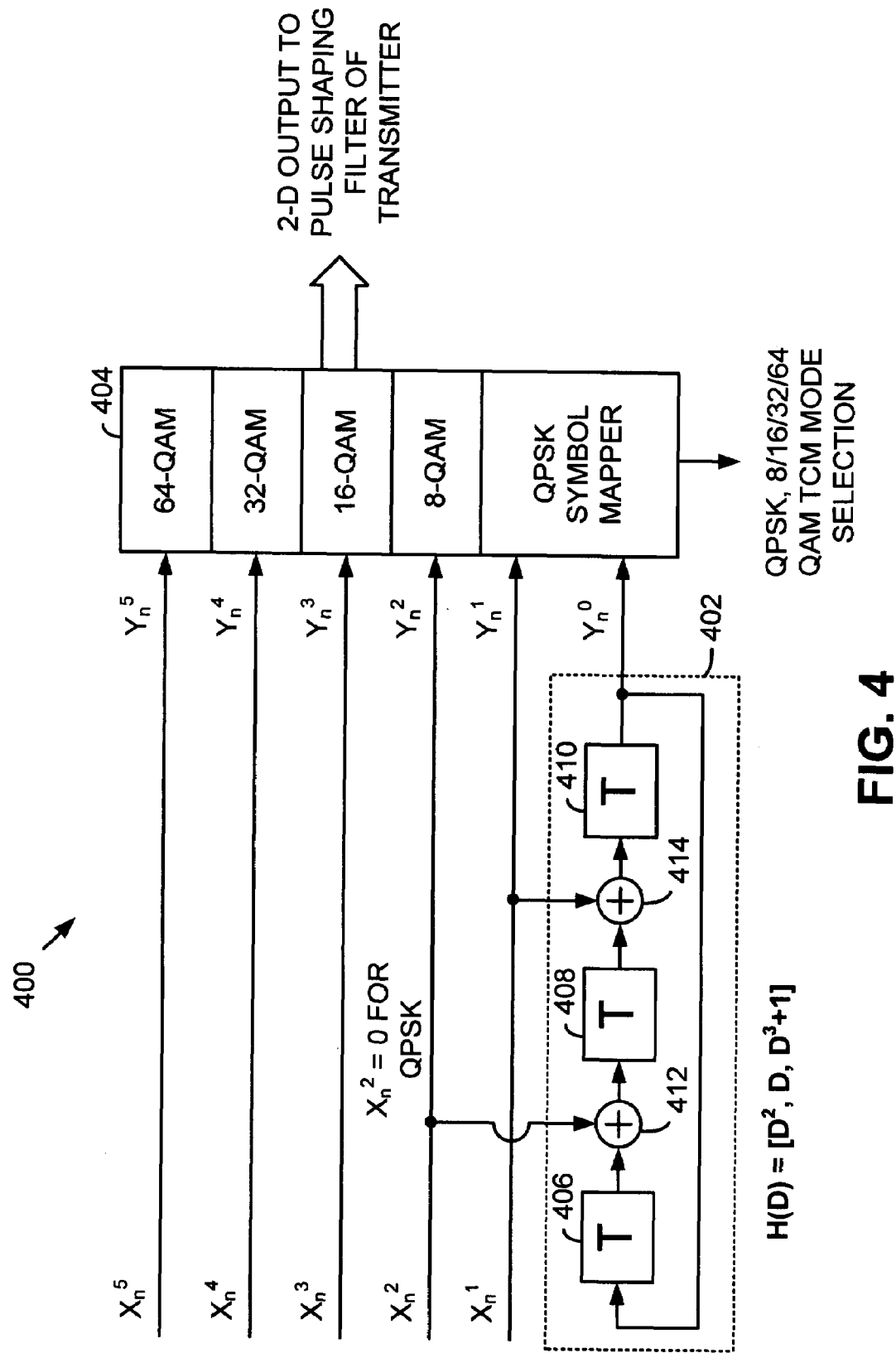
FIG. 4 is a block diagram illustrating a variable data rate Trellis Code Modulation (TCM) encoder constructed according to the present invention.

FIG. 4 is a block diagram illustrating a variable data rate TCM encoder 400 constructed according to the present invention. The variable data rate TCM encoder 400 includes an input that receives at least one input bit each symbol period. The at least one input bit is denoted ($x_n^5$, $x_n^4$, $x_n^3$, $x_n^2$, $x_n^1$) and includes between 1 and 5 information bits. Resultantly, the n superscript notation refers to the respective bit of the 1, 2, 3, 4, 5 information bits while the n subscript notation refers to the "$n^{th}$" symbol. When a QPSK constellation is selected, only information bit $x_n^1$ is employed. When a 64-QAM constellation is selected, all 5 input bits ($x_n^5$, $x_n^4$, $x_n^3$, $x_n^2$, $x_n^1$) are employed. The variable data rate TCM encoder 400 also includes a Finite State Machine (FSM) 402 and a variable rate symbol mapper 404. The variable rate symbol mapper 404 produces two-dimensional output to the pulse-shaping filter 254.

The FSM 402 includes storage elements 406, 408, and 410 and modulo-two adders 412 and 414. For each symbol period, the FSM 402 receives a first FSM input bit $x_n^1$ and a second FSM input bit $x_n^2$ of the at least one input bit. When a QPSK constellation is employed, input bit $x_n^2$ is set to zero. The FSM 402 encodes the first FSM input bit and the second FSM input bit to produce an FSM output bit $y_n^0$.

The variable rate symbol mapper 404 operably couples to the variable rate input and to the FSM 402. With this connectivity, the variable rate symbol mapper 404 receives the bits ($y_n^5$, $y_n^4$, $y_n^3$, $y_n^2$, $y_n^1$, $y_n^0$), wherein $y_n^0$ corresponds to the FSM output bit, $y_{n1}$ corresponded to $x_n^1$, and $y_n^2$ corresponds to $x_n^2$. Further, $y_n^4$, $y_n^3$, $y_n^2$ correspond to input bits $x_n^4$, $x_n^3$, $x_n^2$. Note that the bits $y_n^2$, $y_n^1$, $y_n^0$ may be referred to as "coded" bits since they are "coded" by the FSM 402 while bits $y_n^5$, $y_n^4$, $y_n^3$ are "uncoded" by the FSM 402.

For each symbol period, the variable rate symbol mapper 404 receives the at least one input bit, the FSM output bit, and a mode selection input that selects a constellation of a plurality of supported constellations including a Quadrature Phase Shift Keying (QPSK) constellation and at least one higher order constellation. At least the FSM output bit $y_n^0$ is employed to indicate a plurality of valid constellation points of a selected constellation. The plurality of valid constellation points is a subset of all constellation points of the selected constellation. Further, at least one input bit is employed by the variable rate symbol mapper to select a constellation point of the plurality of valid constellation points as a variable data rate TCM output.

Figure 10:
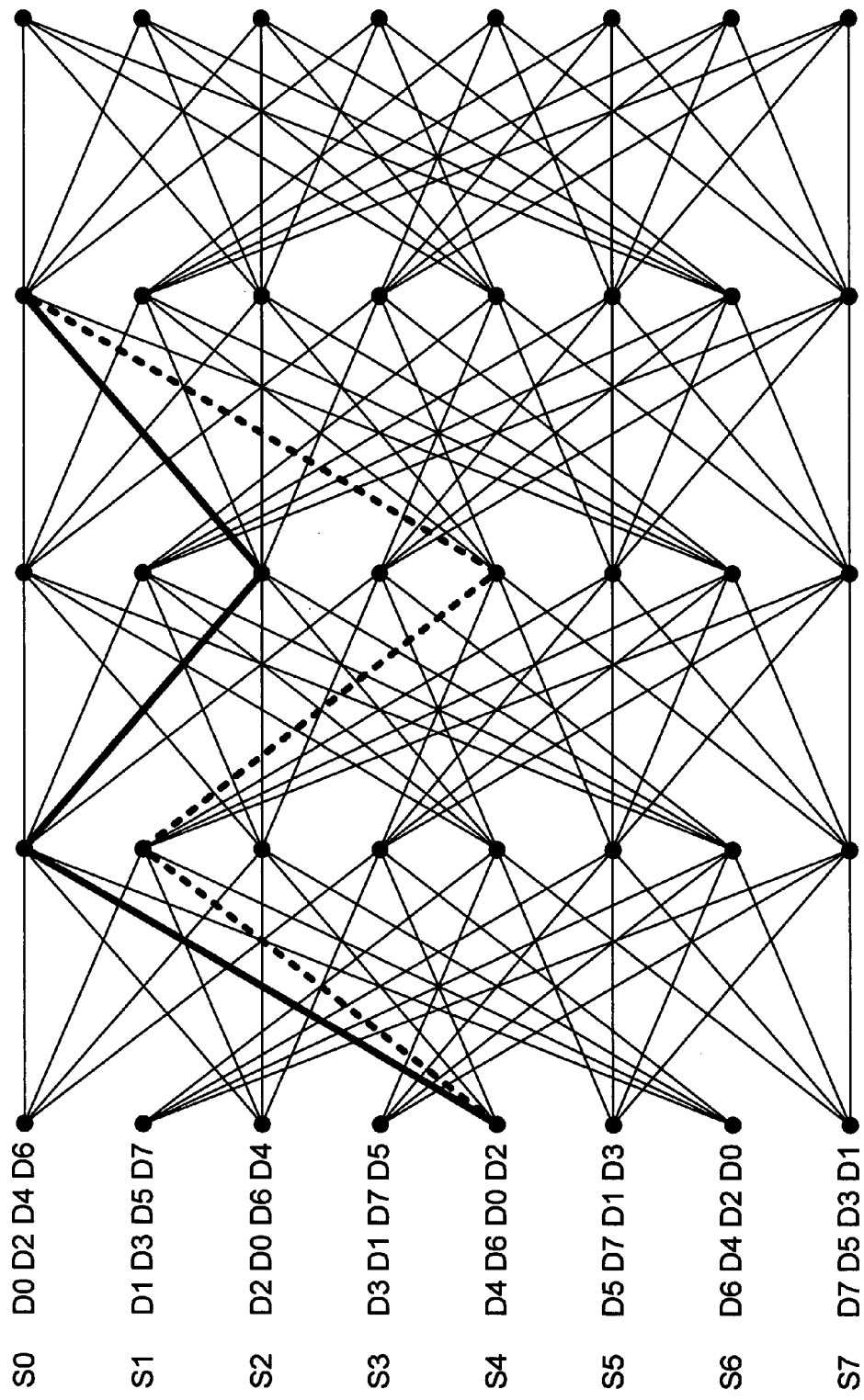
FIG. 10 is a Trellis diagram illustrating a 16-QAM and higher order state transition operation corresponding to the variable data rate TCM encoder of FIG. 4.
Figure 11:
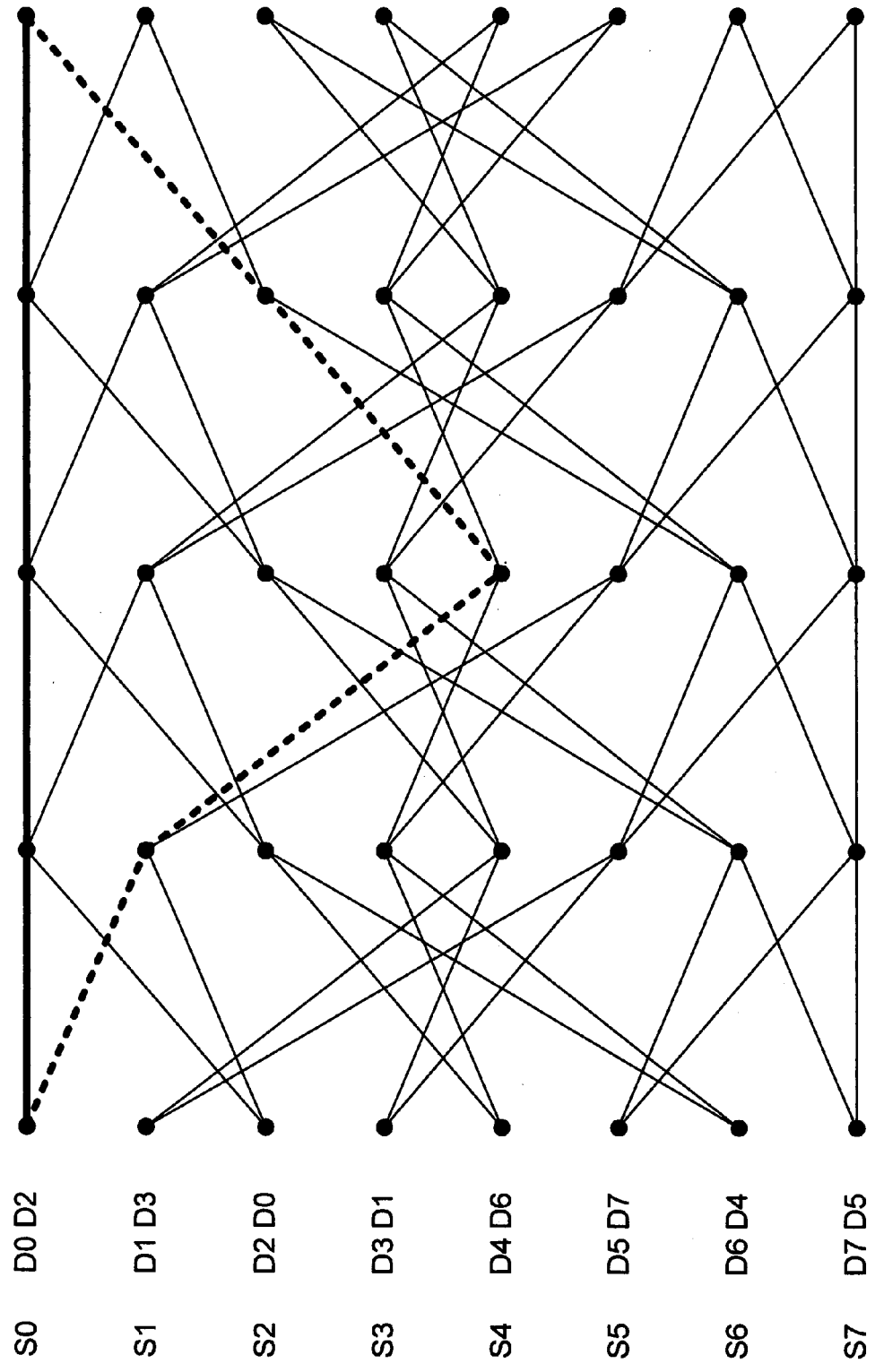
FIG. 11 is a Trellis diagram illustrating a QPSK state transition operation corresponding to the variable data rate TCM encoder of FIG. 4.

The FSM 402 is an 8-state FSM. The coded bits ($y_n^2$, $y_n^1$, $y_n^0$) produced by the FSM 402 are particularly important because they are instrumental in the constellation set partitioning process shown in FIGS. 6–9, which increases the minimum intra-subset Euclidean distance. As will be described further with reference to FIGS. 6–9, with 64-QAM constellations, the bits ($y_n^2$, $y_n^1$, $y_n^0$) select one of the subsets D0, . . . , D7 and the remaining bits ($y_n^5$, $y_n^4$, $y_n^3$) select one of the symbols in the subset. Furthermore, the 8-state FSM introduces the state transition rules, as shown in FIGS. 10 and 11 for the variable data rate TCM encoder of FIG. 4.

Figure 5A:
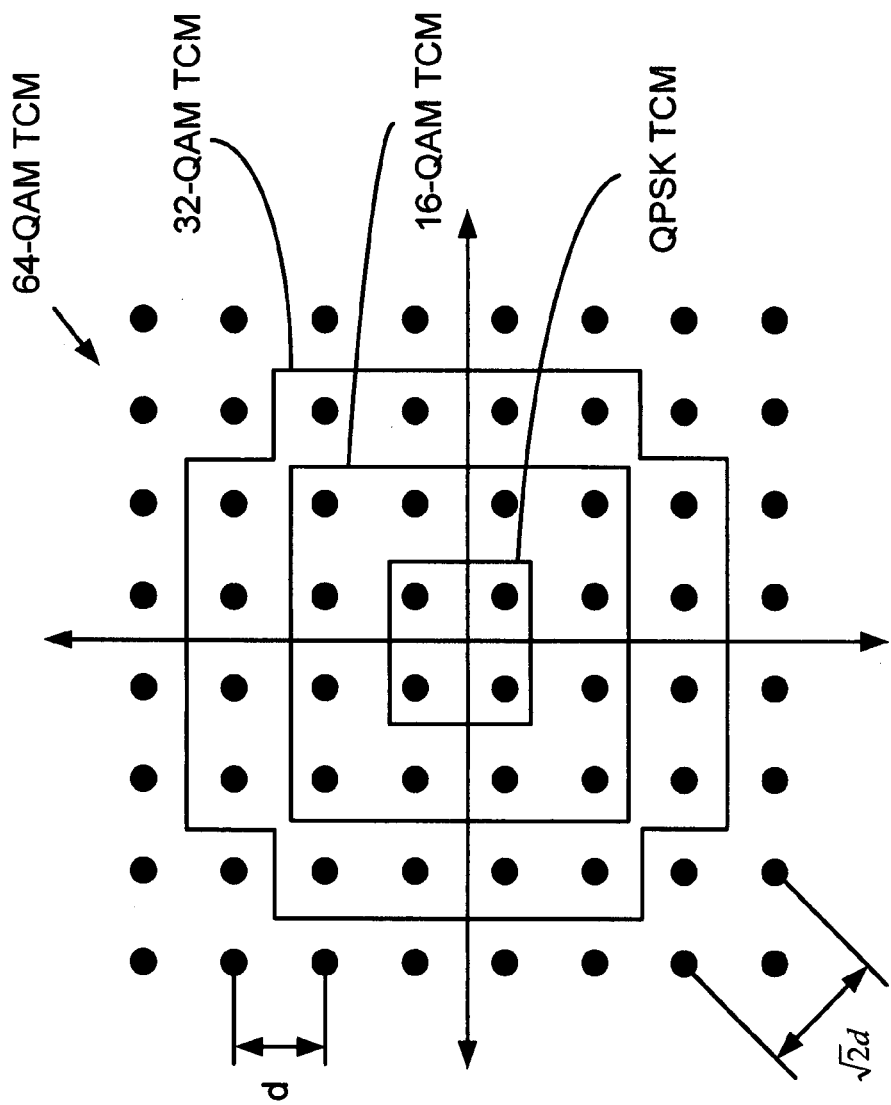
FIG. 5A is a diagram illustrating a full 64-Quadrature Amplitude Modulation (QAM) constellation produced by the variable data rate TCM encoder of FIG. 4 and the relation of constellation points of the 64-QAM constellation to constellation points of lower order modulations supported according to the present invention.

FIG. 5A is a diagram illustrating a full 64-Quadrature Amplitude Modulation (QAM) constellation produced by the variable data rate TCM encoder of FIG. 4 and the relation of constellation points of the 64-QAM constellation to constellation points of lower order modulations supported according to the present invention. The constellation illustrated in FIG. 5 includes a plurality of constellation points. With 64-QAM constellations, each of these constellation points may be employed for any particular symbol, subject to the TCM codes employed. For 32-QAM operations, the constellation has fewer constellation points, as is indicated by the 32-QAM border shown in FIG. 5. Further shown in FIG. 5 are the constellation boundaries and corresponding constellation points for 16-QAM, 8-QAM, and QPSK constellations.

From FIG. 5A, the squared Euclidean distance ("Euclidian distance property") between the uncoded symbols in any of the QAM constellations or the QPSK constellation is "$d^2$". Increasing this squared-distance "$d^2$" between symbols increases the immunity of the receiver to noise. In the uncoded case, this can only be accomplished at the expense of more transmitted power. For instance, consider a multimode QAM transmission system capable of transmitting signals in one of the following modulation formats: QPSK, 8-QAM, 8-PSK, 16-QAM, 32-QAM, and 64-QAM. An example family of these signal constellations is shown in FIG. 5. Extensions to higher order QAM modulations (128, 256-QAM and so on) are straightforward. In the QPSK mode, the transmitted signals are selected from one of the 4 symbols shown in the QPSK constellation.

For the uncoded QPSK case, each transmitted symbol carries 2 bits of information. When TCM is used, each transmitted symbol in the QPSK constellation carries one bit of information where the other bit is generated by the variable data rate TCM encoder. This redundant bit does not carry any information but forces a larger minimum Euclidian distance between allowable QPSK symbol sequences, thus increasing the reliability of transmitted signal sequences. In the QPSK modulation case, the TCM code produced corresponds to a rate-½ convolutional code. The coding overhead is much less for higher order QAM modulations since only one bit is added per symbol regardless of the modulation format. For an uncoded 16-QAM, each transmitted symbol carries 4 bits of information, whereas in the Trellis coded case each symbol carries 3 bits of information. In this case, the TCM code produced corresponds to a rate ¾ convolutional code. Likewise, for Trellis coded 32 and 64-QAM cases, the TCM code produced corresponds to rate ⅘ and rate ⅚ convolutional codes, respectively. Examples of how a variable data rate TCM encoder generates the extra bit per symbol for coding purposes is shown in FIGS. 4, 12, 13, and 16.

FIG. 5B is a diagram illustrating one example of an 8-QAM constellation that employs a subset of constellation points of the full 64-QAM constellation of FIG. 4 that may be used with the present invention. FIG. 5C is a diagram illustrating one example of an 8-PSK constellation that may be used with the present invention.

Figure 6:
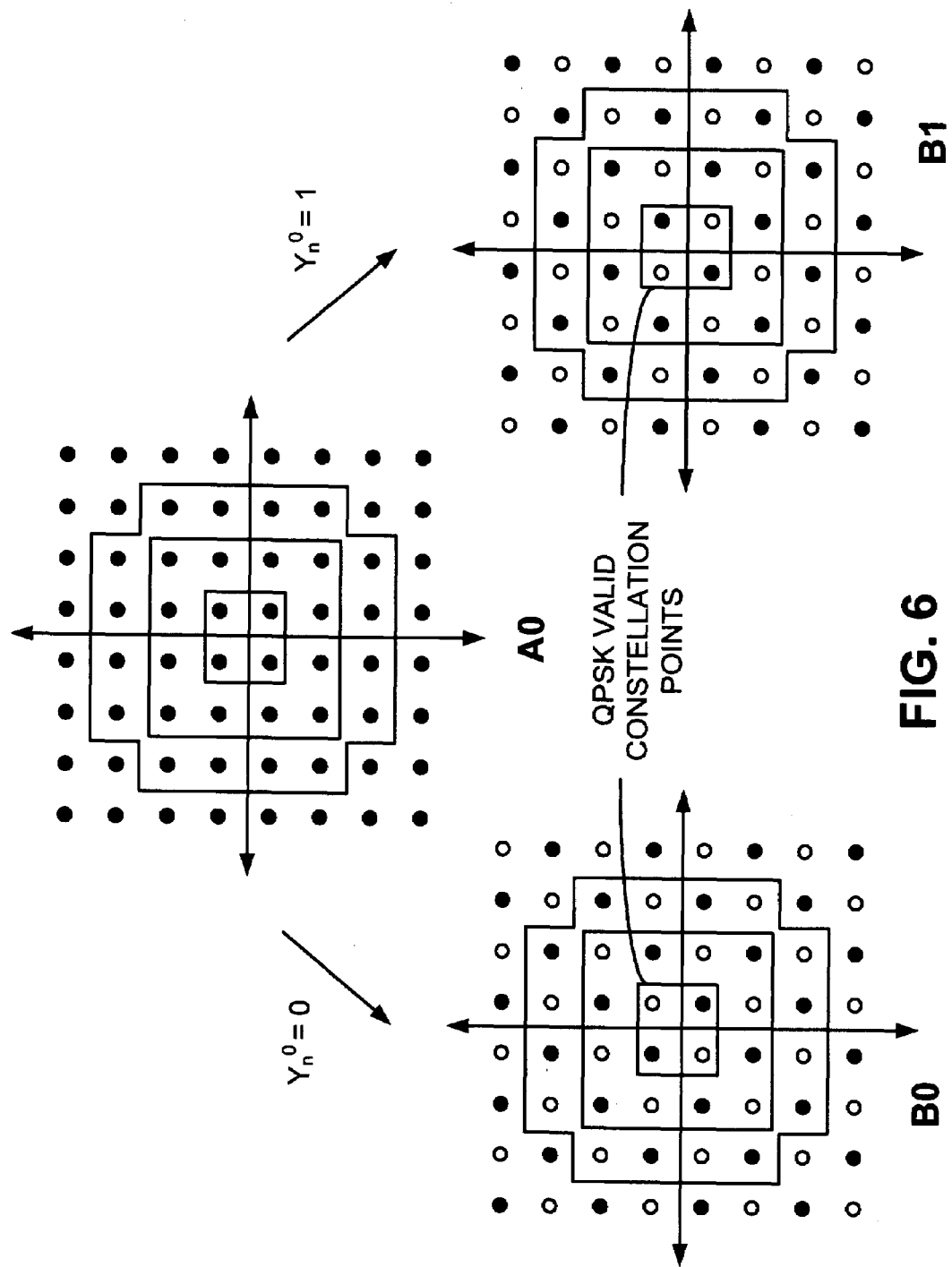
FIGS. 6, 7, 8, and 9 are diagrams illustrating a set portioning process according to the present invention.

FIGS. 6, 7, 8, and 9 are diagrams illustrating a set portioning process according to the present invention. This set partitioning process corresponds to the variable data rate TCM encoder 400 of FIG. 4 (as well as the variable data rate TCM encoders 1200, 1300, and 1600 of FIGS. 12, 13, and 16, respectively). Referring particularly to FIG. 6, with bit $y_n^0$ (FSM output bit) employed for a first set partitioning, the full constellation is divided into two constellation partitions (B0 and B1), each of which has a set of valid constellation points. With a QPSK constellation employed, each of these constellation partitions has two valid constellation points. Thus, for QPSK constellation, bit $y_n^1$ is employed to select one of the valid constellation points. For the valid constellation points for QPSK constellation, the constellations B0 and B1 have constellation properties with a minimum squared distance minimum squared distance of "$2d^2$".

Figure 7:
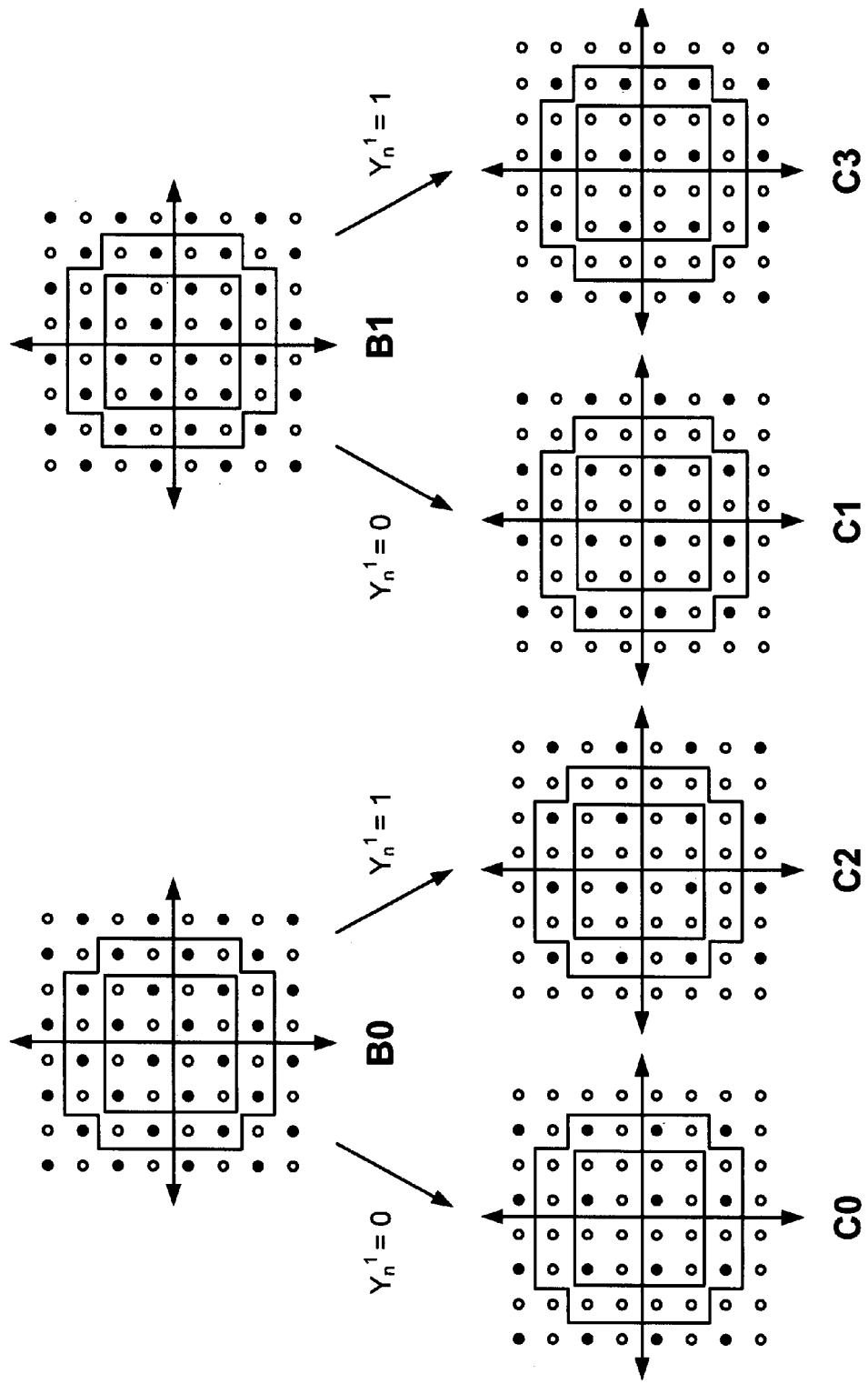

Referring now to FIG. 7, a second constellation partition is employed for 8-QAM constellation operations. For the 8-QAM case, the B0 Branch of FIG. 7 is considered. The eight darkened points in the smallest outline square of the constellation of FIG. 7 correspond to the 8-QAM constellation. Set partitioning reduces these constellation points first to constellations C0 and C2 and further to constellations D0, D4, D2, and D6. The bit $y_n^2$ is then used to select one symbol out of subset D0, D4, D2, or D6. For the valid constellation points for 8-QAM constellations, the constellations D0, D4, D2, and D6 have constellation properties with a minimum squared distance minimum squared distance of "$8d^2$".

Figure 8:
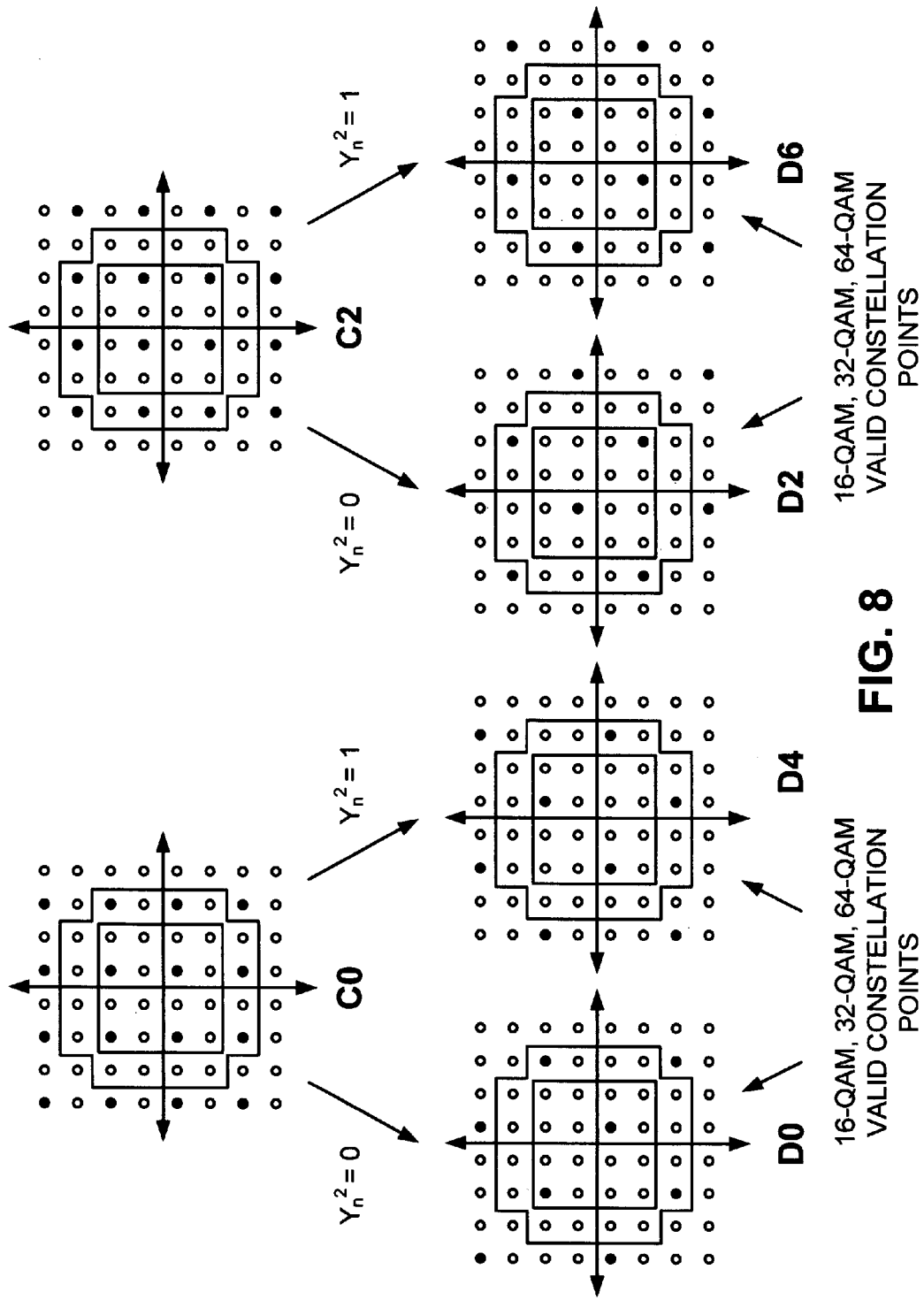
Figure 9:
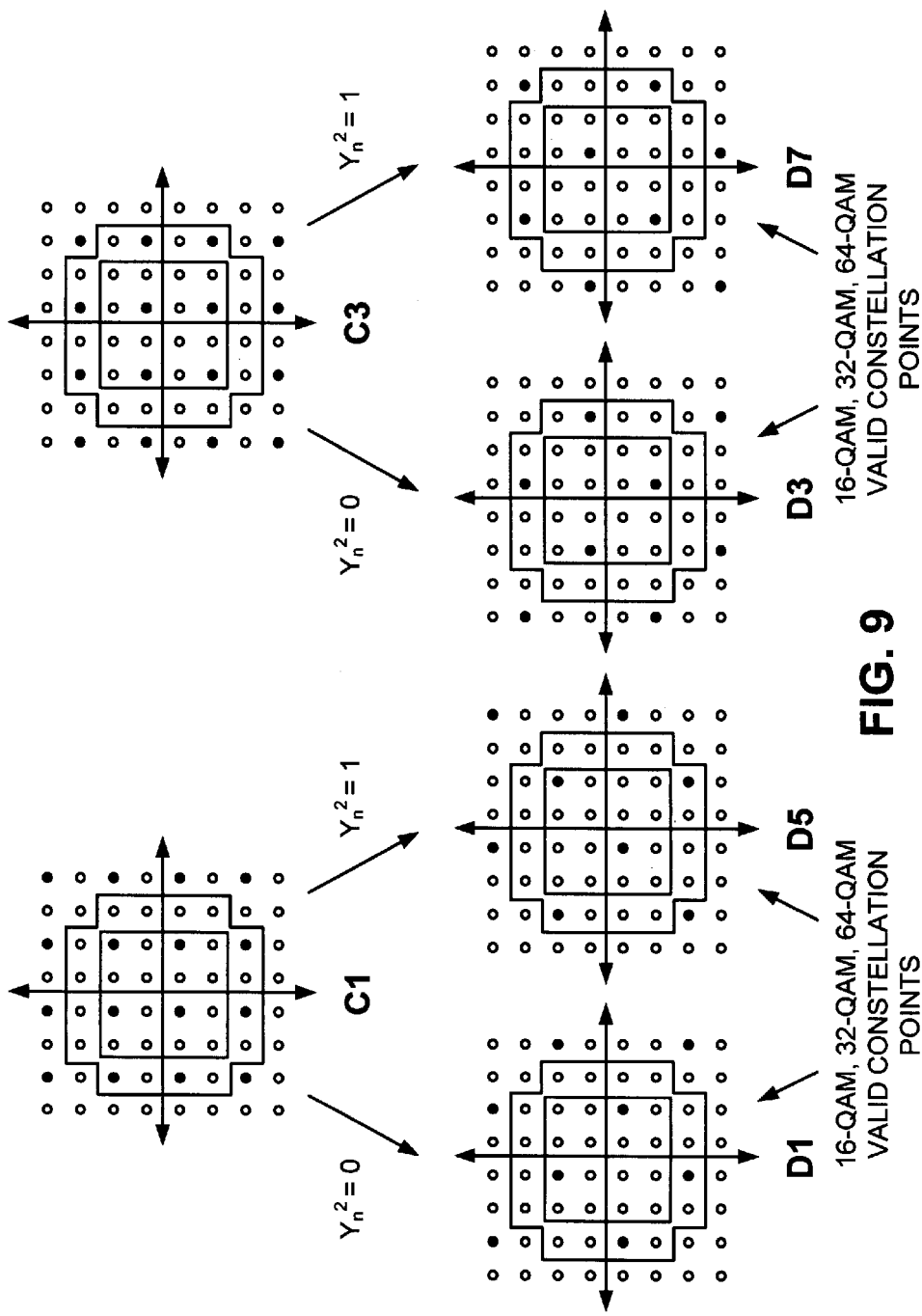

Referring now to FIGS. 8 and 9, a third constellation partition is employed for 16-QAM constellation and higher order constellation operations, e.g., 32-QAM, 64-QAM, etc. The additional bit $y_n^2$ is employed to further partition the full constellation into constellation partitions D0, D1, D2, D3, D4, D5, D6, and D7. For 16-QAM operations, the bit $y_n^3$ is then used to select a valid constellation point from a particular constellation partition. For 32-QAM operations, the bits $y_n^3$ and $y_n^4$ are then used to select a valid constellation point from a particular constellation partition. Finally, for 64-QAM operations, the bits $y_n^3$, $y_n^4$, and $y_n^5$ are then used to select a valid constellation point from a particular constellation partition. With this constellation partition, the distance between valid constellation points of constellation partitions D0, D2, D4, and D6 is "$8d^2$". Further, the distance between valid constellation points of constellation partitions D1, D3, D5, and D7 is also "$8d^2$".

FIG. 10 is a Trellis diagram illustrating a 16-QAM and higher order state transition operation corresponding to the variable data rate TCM encoder of FIG. 4. An error event occurs at the receiver when the sequence of actual transmitted symbols represented by the solid black line (D4-D4-D2) are actually received as the sequence of symbols represented by the dotted lines (D6-D1-D4) due to noise. This can happen since the starting and ending states for both sequences happen to be the same. However, the squared-distance between these two sequences is $2d^2+d^2+2d^2=5d^2$ compared to $d^2$ in the uncoded case.

Upon examining FIG. 10, many other possible error events can be found. However, none of these error events exhibits a squared distance of less than $5d^2$, which is called the minimum squared distance of this particular TCM code. The 8-state FSM Trellis transitions shown in FIG. 10 correspond to TCM codes applied to 8-QAM and higher order QAM constellations.

FIG. 11 is a Trellis diagram illustrating a QPSK state transition operation corresponding to the variable data rate TCM encoder of FIG. 4. For the QPSK-TCM case, since one information bit is encoded per TCM symbol, the input bit $x_n^2$ is assigned to zero, as shown in FIG. 4. After this modification, the new 8-State FSM Trellis transition diagram is shown in FIG. 11. The minimum squared distance of the QPSK-TCM code remains unchanged at $5d^2$ as shown in FIG. 11 between the sequences represented by solid and dashed lines. Thus, the particular TCM code produced by the variable data rate TCM encoder 400 shown in FIG. 4 has a minimum squared distance of $5d^2$ when applied to both QPSK constellations and higher order constellation, e.g., 8-QAM constellations and above.

A polynomial notation to describe the TCM codes for the variable data rate TCM encoder 400 of FIG. 4 may be expressed in terms of a parity check equation. The parity check equation notation involves the binary output sequence of the variable data rate TCM encoder 400 y(D) (from FIG.

4) and the parity check matrix H(D). For any TCM encoder the binary output sequence must satisfy the parity check equation $$[y^m(D) \ldots y^1(D), y^0(D)] \cdot [H^m(D) \ldots H^1(D), H^0(D)]^T = 0 \quad \text{Equation (1)}$$

For the variable data rate TCM encoder 400 shown in FIG. 4, the parity check matrix H(D) is:

$$H(D) = [D^2, D, D^3 + 1] \quad \text{Equation (2)}$$

With a first group of embodiments of the present invention, the FSM of a corresponding variable data rate TCM encoder is constructed such that it has a parity check matrix that is similar to the parity check matrix of Equation (2) but that has been modified by adding $H^2(D)$ or $H^2(D)+H^1(D)$ to $H^0(D)$. Such modification results in new parity check matrices of $H(D)=[D^2, D, D^3+D^2+1]$ and $H(D)=[D^2, D, D^3+D^2+D+1]$.

Figure 12:
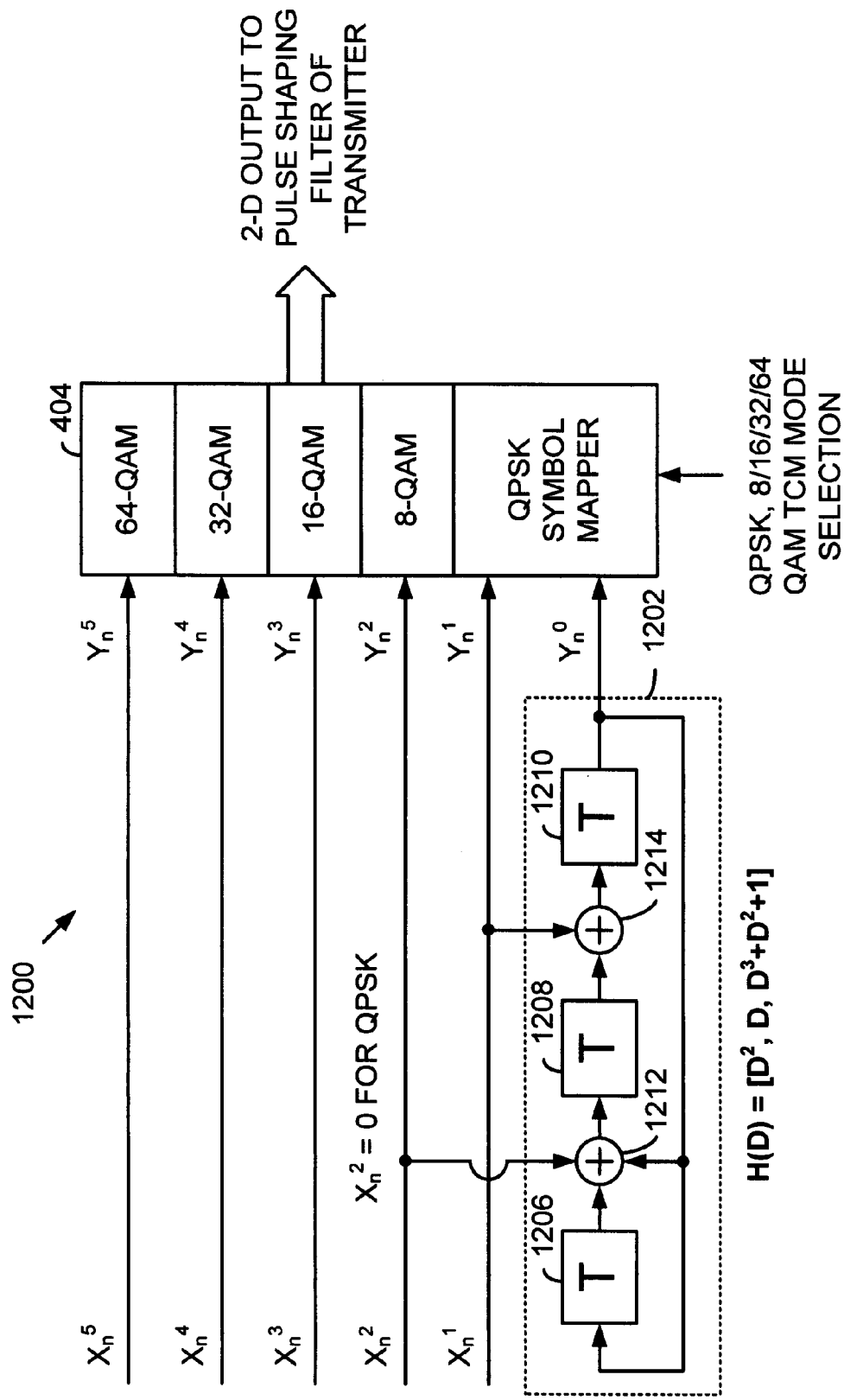
FIG. 12 is a block diagram illustrating a second variable data rate TCM encoder constructed according to the present invention.

FIG. 12 is a block diagram illustrating a second variable data rate TCM encoder 1200 constructed according to the present invention. The structure of the variable data rate TCM encoder 1200 of FIG. 12 is similar to the variable data rate TCM 400 of FIG. 4 but with modifications that result in a FSM 1202 of the TCM encoder 1200 to correspond to the parity check matrix: $H(D)=[D^2, D, D^3+D^2+1]$. As shown, the FSM 1202 includes storage elements 1206, 1208, and 1210 and modulo-two adders 1212 and 1214. This structure of the FSM 1202 corresponds to the desired parity matrix.

Figure 13:
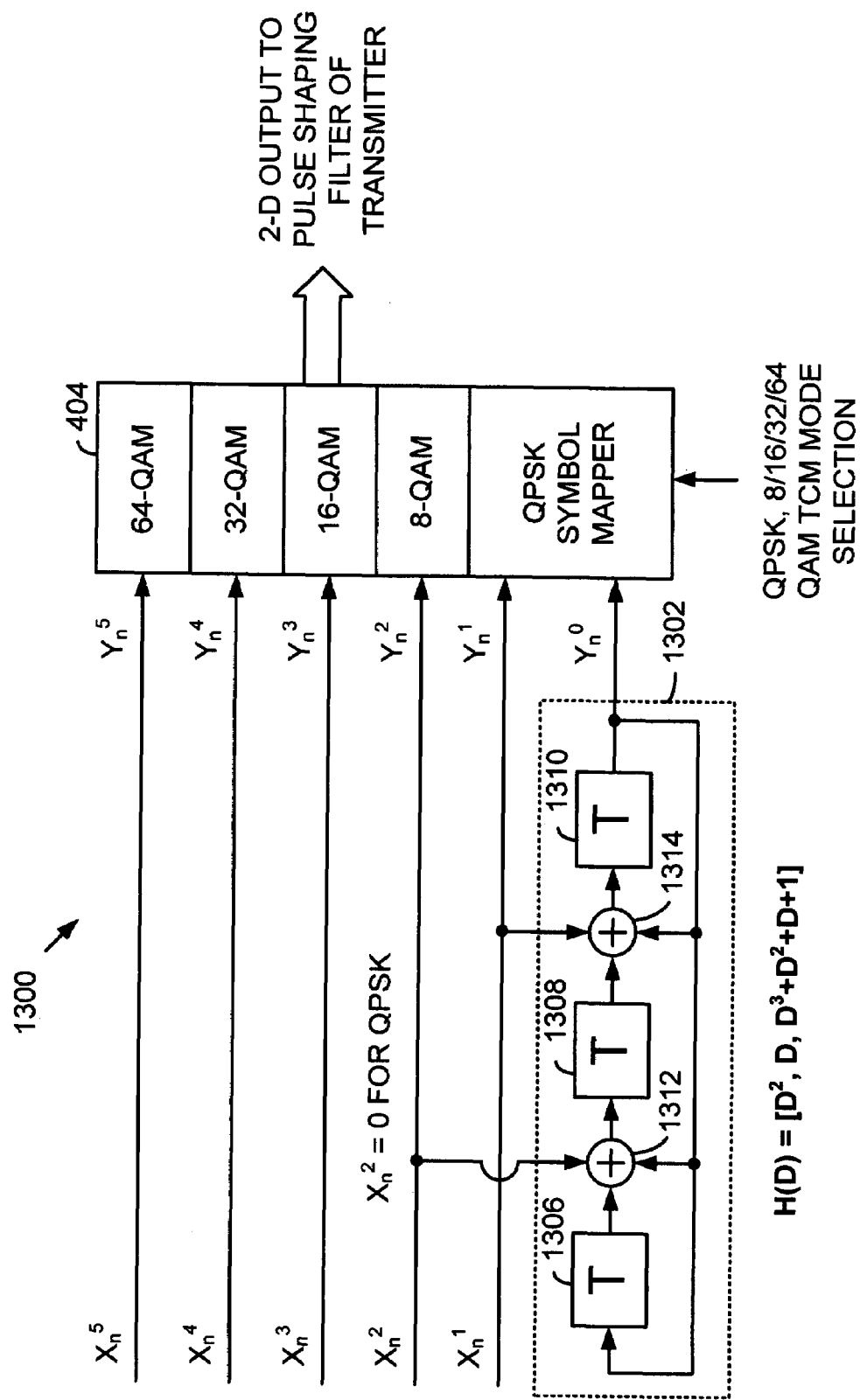
FIG. 13 is a block diagram illustrating a third variable data rate TCM encoder constructed according to the present invention.

FIG. 13 is a block diagram illustrating a third variable data rate TCM encoder 1300 constructed according to the present invention. The structure of the variable data rate TCM encoder 1300 of FIG. 13 is similar to the variable data rate TCM 400 of FIG. 4 but with modifications that result in a FSM 1302 of the TCM encoder 1300 to correspond to the parity check matrix: $H(D)=[D^2, D, D^3+D^2+D+1]$. As shown, the FSM 1302 includes storage elements 1306, 1308, and 1310 and modulo-two adders 1312 and 1314. This structure of the FSM 1302 corresponds to the desired parity matrix.

Figure 14:
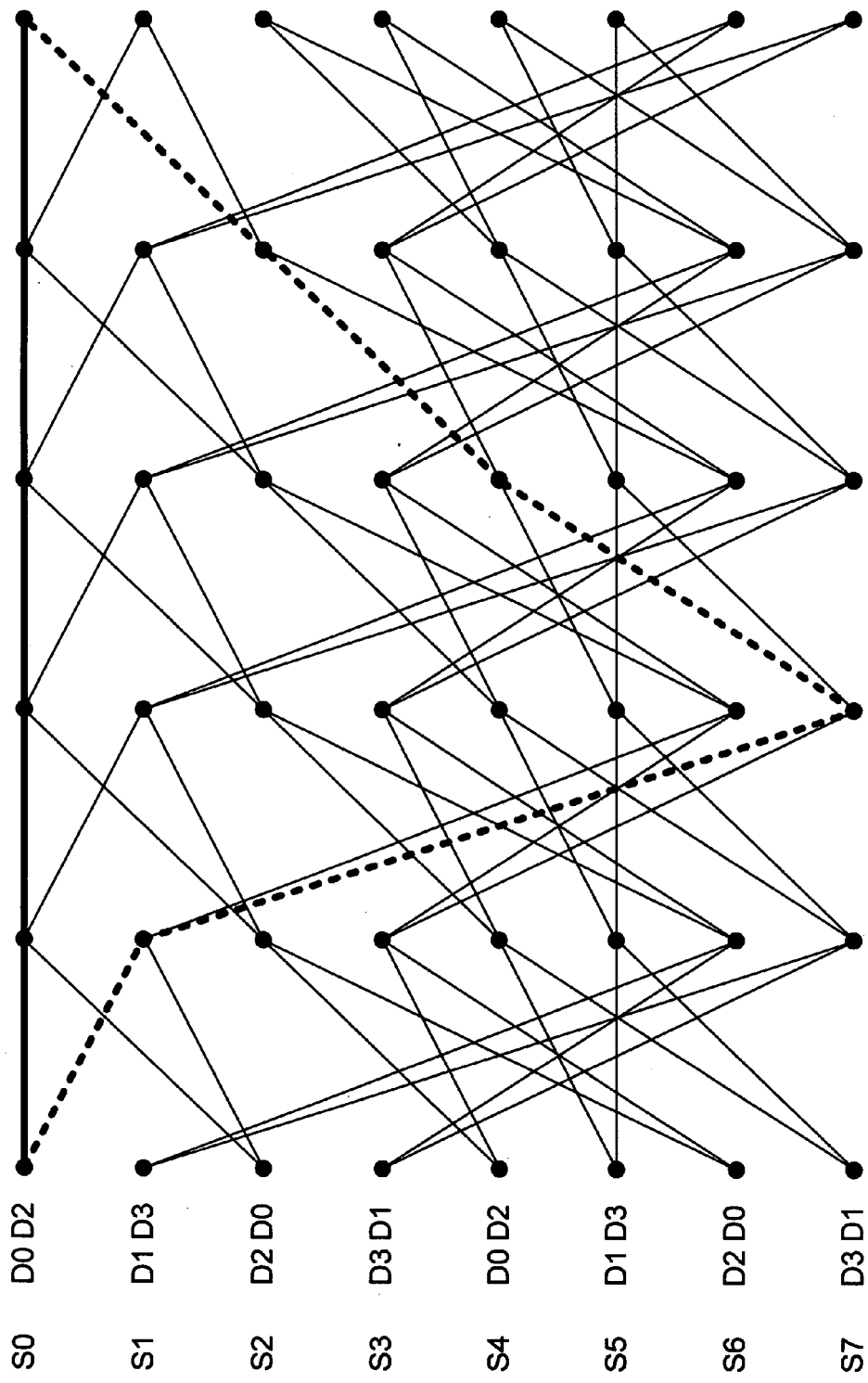
FIG. 14 is a Trellis diagram illustrating a QPSK state transition operation corresponding to the variable data rate TCM encoder of FIG. 12.

FIG. 14 is a Trellis diagram illustrating a QPSK state transition operation corresponding to the variable data rate TCM encoder of FIG. 12. The Trellis diagram of FIG. 14 transitions according to the parity check matrix: $H(D)=[D^2, D, D^3+D^2+1]$. Upon examining FIG. 14, many possible error events can be found. However, none of these error events exhibit a squared distance of less than $6d^2$, which is called the minimum squared distance of this particular TCM code (the squared minimum distance error between the sequences represented by the solid and dashed lines).

Figure 15:
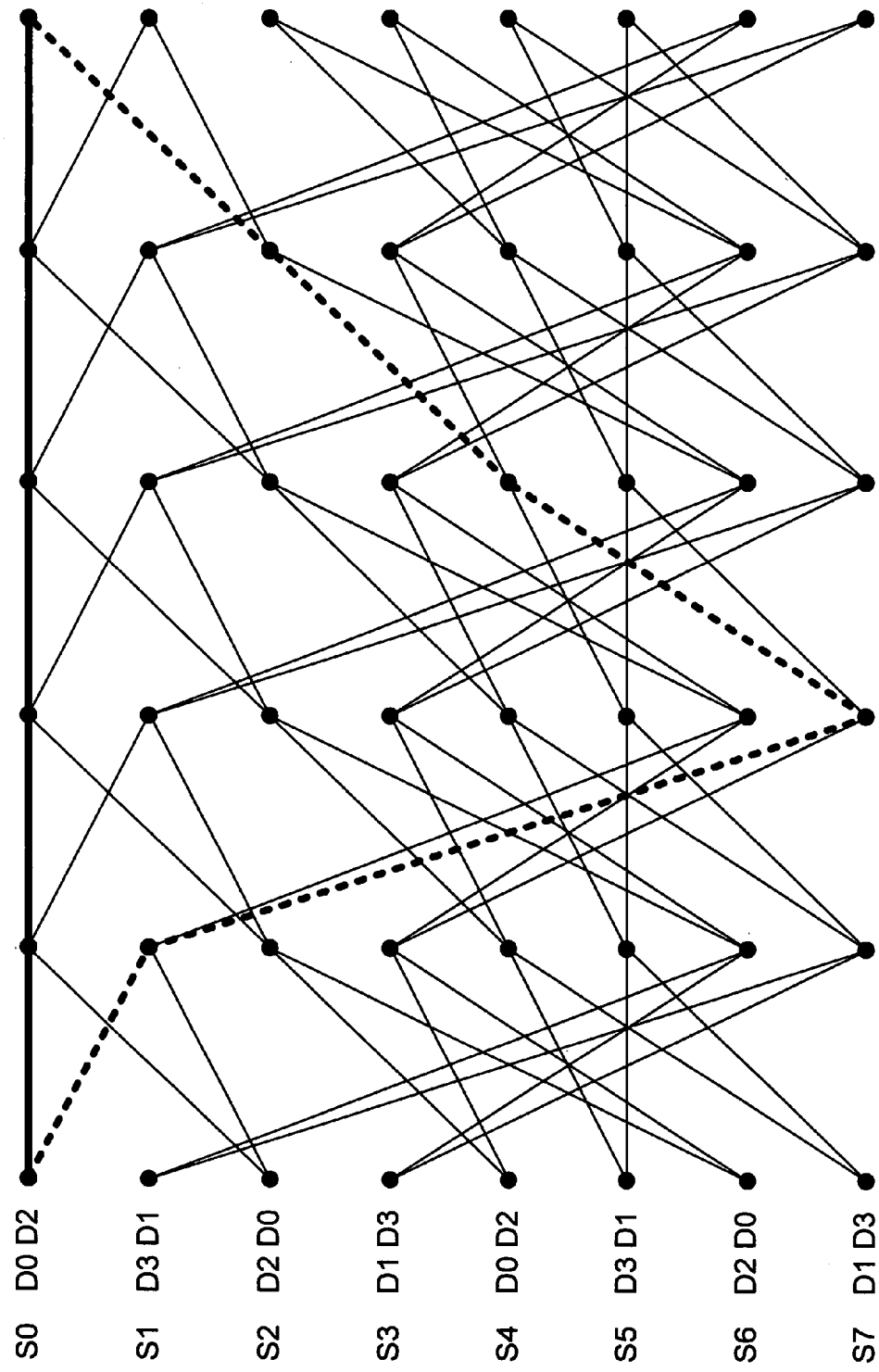
FIG. 15 is a Trellis diagram illustrating a QPSK state transition operation corresponding to the variable data rate TCM encoder of FIG. 13.

FIG. 15 is a Trellis diagram illustrating a QPSK state transition operation corresponding to the variable data rate TCM encoder of FIG. 13. The Trellis diagram of FIG. 14 transitions according to the parity check matrix: $H(D)=[D^2, D, D^3+D^2+D+1]$. Upon examining FIG. 15, many possible error events can be found. However, none of these error events exhibit a squared distance of less than $6d^2$, which is called the minimum squared distance of this particular TCM code (the squared minimum distance error between the sequences represented by the solid and dashed lines).

The modified TCM codes represented in the Trellis shown in FIGS. 14 and 15 have the same squared minimum distance of $5d^2$ as before when applied to constellations of 8-QAM and above. The advantage of the modified variable data rate TCM encoders are realized when the encoding is dropped to QPSK mode. In these cases, the squared minimum distance is increased to $6d^2$ compared to the variable data rate TCM encoder 400 shown in FIG. 4. This corresponds to an additional coding gain of approximately 0.8 dB, a significant difference.

Figure 16:
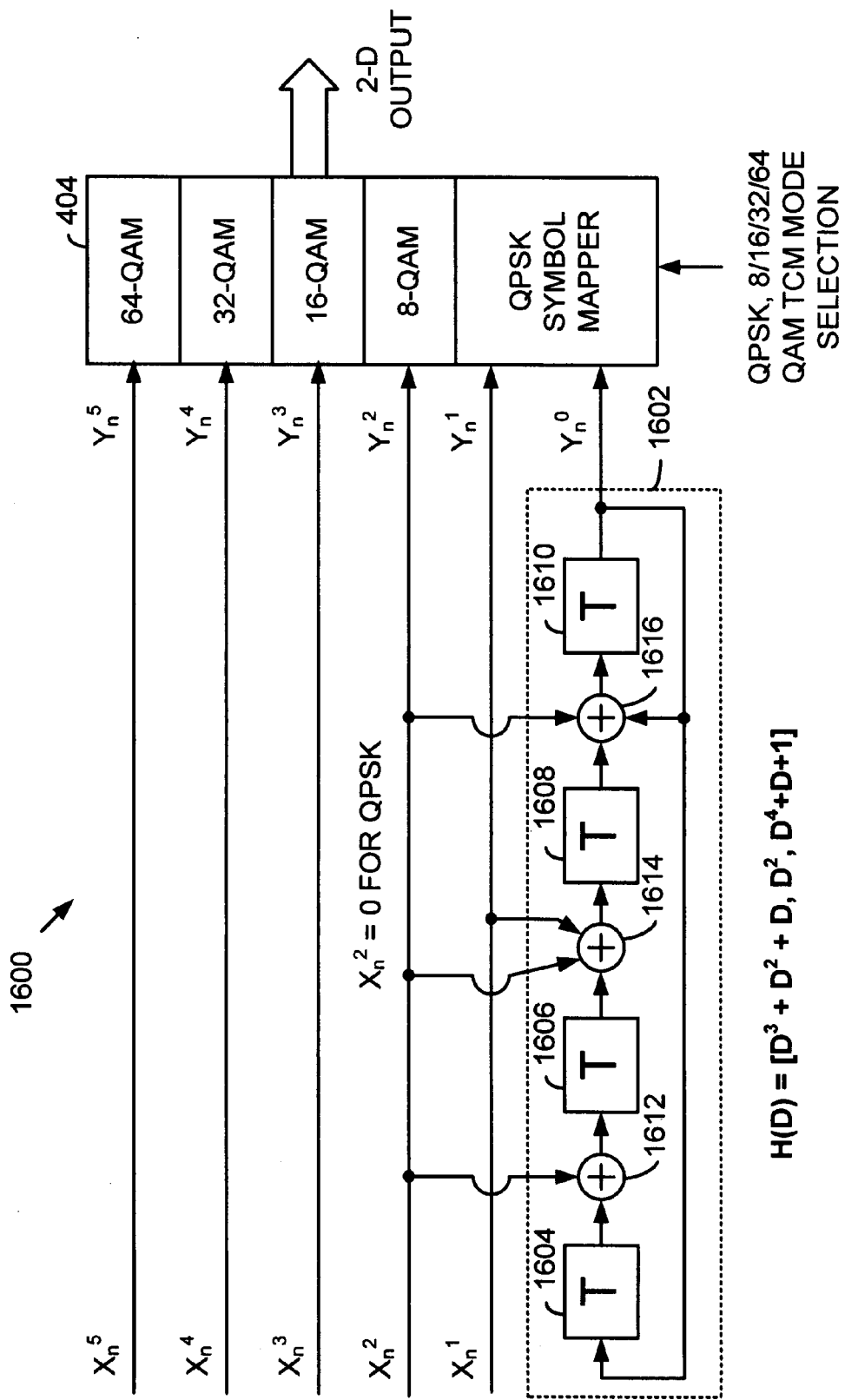
FIG. 16 is a block diagram illustrating a fourth variable data rate TCM encoder constructed according to the present invention.

FIG. 16 is a block diagram illustrating a fourth variable data rate TCM encoder constructed according to the present invention. The structure of the variable data rate TCM encoder 1600 of FIG. 16 is similar to the variable data rate TCM 400 of FIG. 4 but with modifications that result in a FSM 1602 of the TCM encoder 1600 to correspond to the parity check matrix: $H(D)=[D^3+D^2+D, D^2, D^4+D+1]$. As shown, the FSM 1602 includes four (4) storage elements 1604, 1606, 1608, and 1610 and modulo-two adders 1612, 1614, and 1616. Because the FSM 1602 has four storage elements, the FSM 1602 is a 16 state FSM. This structure of the FSM 1602 corresponds to the desired parity matrix.

Figure 17:
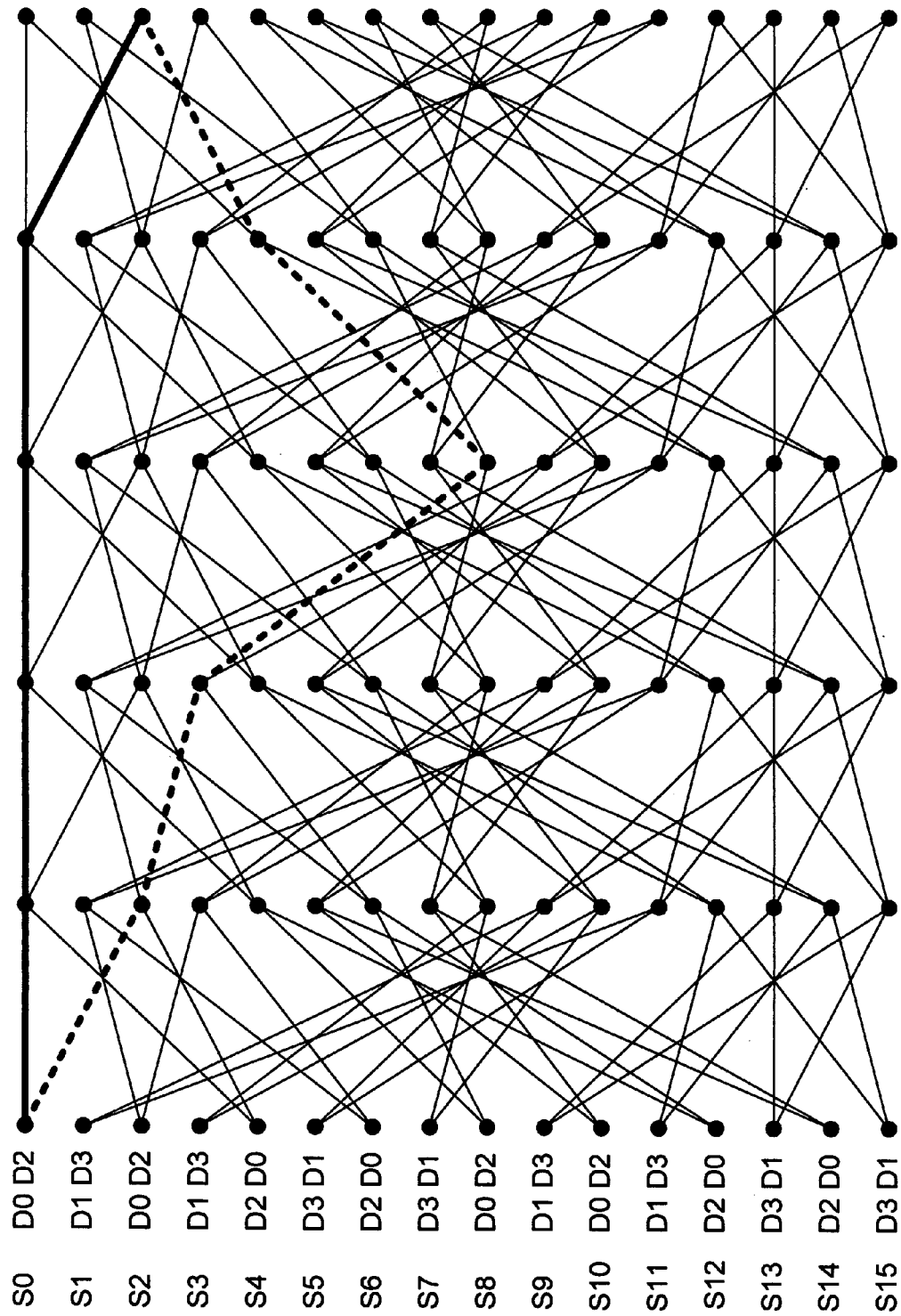
FIG. 17 is a Trellis diagram illustrating a QPSK state transition operation corresponding to the variable data rate TCM encoder of FIG. 16.

FIG. 17 is a Trellis diagram illustrating a QPSK state transition operation corresponding to the variable data rate TCM encoder of FIG. 16. The Trellis diagram of FIG. 14 transitions according to the parity check matrix: $H(D)=[D^3+D^2+D, D^2, D^4+D+1]$. Upon examining FIG. 17, many possible error events can be found. However, none of these error events exhibit a squared distance of less than $7d^2$, which is called the minimum squared distance of this particular TCM code (the squared minimum distance error between the sequences represented by the solid and dashed lines).

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A variable data rate Trellis Code Modulation (TCM) encoder comprising:
   a variable rate input that receives at least one input bit each symbol period;
   a Finite State Machine (FSM) receiving two FSM inputs, wherein a first FSM input of the two FSM inputs receives a first input bit of the at least one input bit, wherein a second FSM input of the two FSM inputs receives a second input bit of the at least one input bit when present and receives a zero when the second input bit of the at least one input bit is not present, wherein each symbol period the FSM produces an FSM output bit based upon the two FSM inputs, wherein:
      the FSM includes three storage elements and two modulo-two adders that are inter-coupled with one another; and
      the FSM is characterized by a parity check matrix of $[D^2, D, D^3+D^2+1]$ or the time-reversed equivalent thereof;
   a variable rate symbol mapper operably coupled to the variable rate input and to the FSM, wherein the variable rate symbol mapper, for each symbol period, receives the at least one input bit, the FSM output bit, and a mode selection input that selects a constellation of a plurality of supported constellations including a Quadrature Phase Shift Keying (QPSK) constellation and at least one higher order constellation;
   wherein at least the FSM output bit is employed to indicate a plurality of valid constellation points of a selected constellation, wherein the plurality of valid constellation points is a subset of all constellation points of the selected constellation; and
   wherein the variable data rate TCM encoder produces TCM codes with optimal Euclidean distance properties for the QPSK constellation and near optimal Euclidian distance properties for the at least one higher order constellation.

2. The variable data rate TCM of claim 1, wherein when the mode selection input selects a QPSK constellation:
   the at least one input bit includes only a first input bit;
   the second FSM input is zero; and
   the FSM output bit indicates a pair of valid constellation points for the QPSK constellation.

3. The variable data rate TCM of claim 2, wherein when die mode selection input selects an 8-Quadrature Amplitude Modulated (QAM) constellation of the at least one higher order constellation:
   the at least one input bit includes a first input bit and a second input bit; and
   the FSM output bit and the first input bit indicate a set of valid constellation points for the 8-QAM constellation.

4. The variable data rate TCM of claim 2, wherein when the mode selection input selects a 16-Quadrature Amplitude Modulated (QAM) constellation of the at least one higher order constellation:
   the at least one input bit includes a first input bit, a second input bit, and a third input bit; and
   the FSM output bit, the first input bit, and the second input bit indicate a set of valid constellation points for the 16-QAM constellation.

5. The variable data rate TCM of claim 2, wherein when the mode selection input selects a 32-Quadrature Amplitude Modulated (QAM) constellation of the at least one higher order constellation:
   the at least one input bit includes a first input bit, a second input bit, a third input bit, and a fourth input bit; and
   the FSM output bit, the first input bit, and the second input bit indicate a set of valid constellation points for the 32-QAM constellation.

6. Thy variable data rate TCM of claim 2, wherein when the mode selection input selects a 64-Quadrature Amplitude Modulated (QAM) constellation of the at least one higher order constellation:
   the at least one input bit includes a first input bit, a second input bit, a third input bit, a fourth input bit, and a fifth input, bit; and
   the FSM output bit, the first input bit, and the second input bit indicate a set of valid constellation points for the 64-QAM constellation.

7. The variable data rate TCM of claim 1, wherein the variable data rate TCM output is two-dimensional.

8. The variable data rate TCM of claim 1, wherein:
   the Euclidean distance properties for the QPSK constellation is $6d^2$ where d is the distance between constellation points; and
   the Euclidian distance properties for the at least one higher order constellation is $5d^2$.

9. A variable data rate Trellis Code Modulation (TCM) encoder comprising:
   a variable rate input that receives at least one input bit each symbol period;
   a Finite State Machine (FSM) receiving two FSM inputs, wherein a first FSM input of the two FSM inputs receives a first input bit of the at least one input bit wherein a second FSM input of the two FSM inputs receives a second input bit of the at least one input bit when present and receives a zero when the second input bit of the at least one input bit is not present, wherein each symbol period the FSM produces an FSM output bit based upon the two FSM inputs, wherein:
   the FSM includes three storage elements and two modulo-two adders that are inter-coupled with one another; and
   the FSM is characterized by a party check matrix of $[D^2, D, D^3+D^2+1]$ or the time-reversed equivalent thereof;
   a variable rate symbol mapper operably coupled to the variable rate input and to the FSM, wherein the variable rate symbol mapper for each symbol period, receives the at least one input bit, the FSM output bit, and a mode selection input that selects a constellation of a plurality of supported constellations including a Quadrature Phase Shift Keying (QPSK) constellation and at least one higher order constellation;
   wherein at least the FSM output bit is employed to indicate a plurality of valid constellation points of a selected constellation, wherein the plurality of valid constellation points is a subset of all constellation points of the selected constellation; and
   wherein when the mode selection Input selects a QPSK constellation, the second input bit is set to zero, the FSM output bit indicates a pair of valid constellation paints for the QPSK constellation, and the first input bit selects a constellation point of the pair of valid constellation points as the variable data rate TCM output; and
   wherein variable data rate TCM encoder produces TCM codes with optimal Euclidean distance properties for the QPSK constellation and new optimal Euclidian distance properties for the at least one higher order constellation.

10. The variable data rate TCM of claim 9, wherein when the mode selection input selects an 8-Quadrature Amplitude Modulated (QAM) constellation of the at least one higher order constellation:
    the at least one input bit includes a first input bit and a second input bit; and
    the FSM output bit and the first input bit indicate a set of valid constellation points for the 8-QAM constellation.

11. The variable data rate TCM of claim 9, wherein when the mode selection input selects a 16-Quadrature Amplitude Modulated (QAM) constellation of the at least one higher order constellation:
    the at least one input bit includes a first input bit, a second input bit, and a third input bit; and
    the FSM output bit the first input bit, and the second input bit indicate a set of valid constellation points for the 16-QAM constellation.

12. The variable data rate TCM of claim 9, wherein when the mode selection input selects a 32-Quadrature Amplitude Modulated (QAM) constellation of the at least one higher order constellation:
    the at least one input bit includes a first input hit, s second input bit a third input bit, and a fourth input bit; and
    the FSM output bit, the first input bit, and the second input bit indicate a set of valid constellation points for the 32-QAM constellation.

13. The variable data rate TCM of claim 9, wherein when the mode selection input selects a 64-Quadrature Amplitude Modulated (QAM) constellation of the at least one higher order constellation:
    the at least one input bit includes a first input bit, a second input bit, a third input bit, a fourth input bit, And a fifth input bit; and
    the FSM output bit the first input bit, and the second input bit indicate a set of valid constellation points fir the 64-QAM constellation.

14. A variable data rate Trellis Code Modulation (TCM) encoder comprising:
a variable rate input that receives at least one input bit each symbol period;
a Finite State Machine (FSM) receiving two FSM inputs, wherein a first FSM input of the two FSM inputs receives a first input bit of the at least one input bit, wherein a second FSM input of the two FSM inputs receives a second input bit of the at least one input bit when present and receives a zero when the second input bit of the at least one input bit is not present, wherein each symbol period the FSM produces an FSM output bit based upon the two FSM inputs;
a variable rate symbol mapper operably coupled to the variable rate input and to the FSM, wherein the variable rate symbol mapper, for each symbol period, receives the at least one input bit, the FSM output bit, and a mode selection input that selects a constellation of a plurality of supported constellations including a Quadrature Phase Shift Keying (QPSK) constipation and at least one higher order constellation;
wherein at least the FSM output bit is employed to indicate a plurality of valid constellation points of a selected constellation, wherein the plurality of valid constellation points is a subset of all constellation points of the selected constellation; and
wherein:
the FSM includes three storage elements and two modulo-two adders that are inter-coupled with one another,
the FSM is characterized by a parity check matrix of $[D^2, D, D^3+D^2+1]$ or the time-reversed equivalent thereof element of the set; and
an element of the set of elements of the parity check matrix corresponding to the FSM output bit includes a plurality of constituent components, wherein at least one constituent component of the plurality of constituent components is identical to an element of the parity check matrix corresponding to a coded bit of the set of coded bits other than the FSM output bit.

15. The variable data rate TCM of claim 14, wherein:
the Euclidean distance properties for the QPSK constellation is $6d^2$ where d is the distance between constellation points; and
the Euclidian distance properties for the at least one higher order constellation is $5d^2$.

16. A variable data rate Trellis Code Modulation (TCM) encoder comprising:
a variable rate input that receives at least one input bit each symbol period;
a Finite State Machine (FSM) receiving two FSM inputs, wherein a first FSM input of the two FSM inputs receives a first input bit of the at least one input bit, wherein a second FSM input of the two FSM inputs receives a second input bit of the at least one input bit when present and receives a zero when the second input bit of the at least one input bit is not present, wherein each symbol period the FSM produces an FSM output bit based upon the two FSM inputs;
a variable rate symbol mapper operably coupled to the variable rate input and to the FSM, wherein the variable rate symbol mapper, for each symbol period, receives the at least one input bit, the FSM output bit, and a mode selection input that selects a constellation of a plurality of supported constellations including a Quadrature Phase Shift Keying (QPSK) constellation and at least one higher order constellation;
wherein at least the FSM output bit is employed to indicate a plurality of valid constellation points of a selected constellation, wherein the plurality of valid constellation points is a subset of all constellation points of the selected constellation; and
wherein:
the FSM includes four storage elements; and
the FSM is characterized by a parity check matrix having a set of elements, wherein each element of the set of elements corresponds to a particular coded bit of the set of coded bits and the parity check matrix is: $[D^3+D^2+D, D^2, D^4+1]$ or the time-reversed equivalent thereof.

17. The variable data rate TCM of claim 16, wherein:
the Euclidean distance properties for the QPSK constellation as $7d^2$ where d is the distance between constellation points; and
the Euclidian distance properties for the at least one higher order constellation is $6d^2$.

18. A wireless communication device comprising:
a Radio Frequency (RF) transceiver;
a baseband receiver section operably coupled to the RF transceiver; and
a baseband transmitter section operably coupled to the RF transceiver that includes a variable data rate Trellis Code Modulation (TCM) encoder having:
a variable rate input that receives at least one input bit each symbol period;
a Finite State Machine (FSM) receiving two FSM inputs, wherein a first FSM input of the two FSM inputs receives a first input bit of the at least one input bit wherein a second FSM input of the two FSM inputs receives a second input bit of the at least one input bit when present and receives a zero when the second input bit of the at least one input bit is not present, wherein each symbol period the FSM produces an FSM output bit based upon the two FSM inputs, wherein:
the FSM includes three storage elements and two modulo-two adders that are inter-coupled with one another; and
the FSM is characterized by a parity check matrix of $[D^2, D, D^3+D^2+1]$ or the time-reversed equivalent thereof;
a variable rate symbol mapper operably coupled to the variable rate input and to the FSM, wherein the variable rate symbol mapper, far each symbol period, receives the at least one input bit, the FSM output bit, and a mode selection input that selects a constellation of a plurality of supported constellations including a Quadrature Phase Shift Keying (QPSK) constellation and at least one higher order constellation;
wherein at least the FSM output bit is employed to indicate a plurality of valid constellation points of a selected constellation, wherein the plurality of valid constellation points is a subset of all constellation points of the selected constellation; and
wherein the variable data rate TCM encoder produces TCM codes with optimal Euclidean distance properties for the QPSK constellation and near optimal Euclidian distance properties for the at least one higher order constellation.

19. The wireless communication device of claim 18, wherein:
the Euclidean distance properties for the QPSK constellation is $6d^2$ where d is the distance between constellation points; and the Euclidian distance properties for the at least one higher order constellation is $5d^2$.

20. The wireless communication device of claim 18, wherein the receiver section further comprises:
a decision feedback equalizer that equalizes incoming signals and produces a plurality of soft decision corresponding to each symbol of a plurality of received symbols; and
a variable TCM decoder that receives the plurality of soft decisions and performs TCM decoding operations consistent with the variable data rate TCM to produce output data.

21. The wireless communication device if claim 20, wherein the TCM decoder of the receiver section further comprises a FSM tat corresponds to the FSM of the TCM of transmitter section.

22. A method for Trellis Code Modulating at least one input bit, the medium comprising:
receiving at least one input bit each symbol period;
encoding, with a Finite State Machine (FSM) each symbol period, a first FSM input and a second FSM input to produce an FSM output bit, wherein the FSM input receives a first input bit of the at least one input bit, wherein the second FSM input receives a second input bit of the at least one input bit when present and receives a zero when the second input bit of the at least one input bit is not present, wherein:
the FSM is operable to implement an inter-coupled combination of three storage elements and two modulo-two adders; and
the FSM is operable to implement a parity check matrix of $[D^2, D, D^3+D^2+1]$ or the time-reversed equivalent thereof;
selecting, each symbol period, a constellation of a plurality of supported constellations including a Quadrature Phase Shift Keying (QPSK) constellation and at least one higher order constellation;
using at least the FSM output bit to indicate a plurality of valid constellation points of a selected constellation, wherein the plurality of valid constellation points is a subset of all constellation points of the selected constellation;
using at least a first input bit of the at least one input bit to select a constellation point of the plurality of valid constellation points as a variable data rate Trellis Code Modulated output; and
wherein codes produced have optimal Euclidean distance properties for the QPSK constellation and near optimal Euclidian distance properties for the at least one higher order constellation.

23. The method of claim 22, wherein when the QPSK constellation is selected:
the at least one input bit includes only a first input bit;
the second FSM input is zero; and
the FSM output bit indicates a pair of valid constellation points for the QPSK constellation.

24. The method of claim 23, wherein when an 8-Quadrature Amplitude Modulated (QAM) constellation of the at least one higher order constellation is selected:
the at least one input bit includes a first input bit and a second input bit; and
the FSM output bit and the first input bit indicate a set of valid constellation points for the 8-QAM constellation.

25. The method of claim 23, wherein when a 16-Quadrature Amplitude Modulated (QAM) constellation of the at least one higher order constellation is selected:
the FSM output bit, the first input bit, and the second input bit indicate a set of valid constellation points for the 16-QAM constellation; and
a third input bit of the at least one input bit selects a constellation point of the set of valid constellation points as the variable data rate TCM output.

26. The method of claim 23, wherein when a 32-Quadrature Amplitude Modulated (QAM) constellation of the at least one higher order constellation is selected:
the at least one input bit includes a first input bit, a second input bit, a third input bit, and a fourth input bit; and
the FSM output bit, the first input bit, and the second input bit indicate a set of valid constellation points for the 32-QAM constellation.

27. The method of claim 23, wherein when a 64-Quadrature Amplitude Modulated (QAM) constellation of the at least one higher order constellation is selected the at least one input bit includes a first input bit, a second input bit, a third input bit a fourth input bit, and a fifth input bit; and
the FSM output bit, the first input bit, and the second input bit indicate a set of valid constellation points for the 64-QAM constellation.

28. The method of claim 22, wherein the variable data rate Trellis Code Modulated output is two-dimensional.

* * * * *